(12) United States Patent
Humair et al.

(10) Patent No.: US 10,922,646 B1
(45) Date of Patent: Feb. 16, 2021

(54) MULTI-ECHELON INVENTORY PLANNING UNDER DYNAMIC FULFILLMENT POLICIES

(71) Applicant: Amazon Technologies, Inc., Seattle, WA (US)

(72) Inventors: Salal Humair, Sammamish, WA (US); Hernan P. Awad, Bellevue, WA (US); Deepak Bhatia, Sammamish, WA (US); Onur Özkök, Issaquah, WA (US); Tolga Han Seyhan, Seattle, WA (US); Arjun Krishna Subramaniam, Seattle, WA (US); Yan Xia, Kenmore, WA (US); Chengliang Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 523 days.

(21) Appl. No.: 15/716,299

(22) Filed: Sep. 26, 2017

(51) Int. Cl.
*G06Q 10/08* (2012.01)
*G06N 20/00* (2019.01)

(52) U.S. Cl.
CPC ........... *G06Q 10/087* (2013.01); *G06N 20/00* (2019.01)

(58) Field of Classification Search
USPC ......................................................... 705/28
See application file for complete search history.

(56) References Cited

U.S. PATENT DOCUMENTS

| | | | |
|---|---|---|---|
| 7,472,077 B2 | 12/2008 | Roseman et al. | |
| 7,685,074 B2 | 3/2010 | Linden et al. | |
| 8,122,020 B1 | 2/2012 | Donsbach et al. | |
| 2006/0007947 A1* | 1/2006 | Li | H04L 67/108 370/432 |
| 2012/0054076 A1* | 3/2012 | Wu | G06Q 10/087 705/28 |
| 2018/0012158 A1* | 1/2018 | Cholewinski | G06Q 10/087 |
| 2018/0012166 A1* | 1/2018 | Devadas | G06Q 10/06315 |

OTHER PUBLICATIONS

Corey Billington, Gianpaolo Callioni, Barrett Crane, John D. Ruark, Julie Unruh Rapp, Trace White, and Sean P. Willems. Accelerating the Profitability of Hewlett-Packard's Supply Chains. Interfaces, 34(1):59-72, 2004. ISSN 0092-2102. doi: 10.1287/inte.0103.0054. URL: http://pubsonline.informs.org/doi/abs/10.1287/inte.0103.0054.

Jeffrey D. Camm and Sridhar Tayur. Editorial: How to Monetize the Value of OR. Interfaces, 40(6):446-450, 2010. ISSN 0092-2102. doi: 10.1287/inte.1100.0524. URL: http://pubsonline.informs.org/doi/abs/10.1287/inte.1100.0524.

(Continued)

*Primary Examiner* — Oluseye Iwarere
*Assistant Examiner* — Reva R Moore
(74) *Attorney, Agent, or Firm* — Knobbe, Martens, Olson & Bear, LLP

(57) ABSTRACT

Features related to systems and methods for predictive estimation for network inventory planning for items for distribution through a multi-echelon network are disclosed. The problem may be modeled to account for demand for an item that may be satisfied by fulfillment centers within the network. The model considers benefits to ensuring adequate inventory to meet expected demand streams along with any savings accruing from a lower transfer and salvage costs.

20 Claims, 9 Drawing Sheets

(56) References Cited

OTHER PUBLICATIONS

Andrew J. Clark and Herbert Scarf. Optimal Policies for a Multi-Echelon Inventory Problem. Management Science, 6(4):475-490, 1960. doi: 10.1287/mnsc.6.4.475. URL: http://dx.doi.org/10.1287/mnsc.6.4.475.

Gary Eppen and Linus Schrage. Centralized Ordering Policies in a Multi-Warehouse System with Lead Times and Random Demand, pp. 51-67. TIMS Studies in the Management Sciences 16. North-Holland Publishing Company, 1981.

M. Ettl, G. E. Feigin, G. Y. Lin, and D. D. Yao. A Supply Network Model with Base-Stock Control and Service Requirements. Operations Research, 49(2):216-232, 2000.

Ingrid Farasyn, Salal Humair, Joel I. Kahn, John J. Neale, Oscar Rosen, John Ruark, William Tarlton, Wilm Van de Velde, Glenn Wegryn, and Sean P. Willems. Inventory Optimization at Procter & Gamble: Achieving real Benefits Through User Adoption of Inventory Tools. Interfaces, 41(1):66-78, 2011. ISSN 0092-2102. doi: 10.1287/inte.1100.0546. URL: http://dx.doi.org/10.1287/inte.1100.0546.

Awi Federgruen and Paul Zipkin. Approximations of Dynamic, Multilocation Production and Inventory Problems. Management Science, 30(1):69-84, 1984. doi: 10.1287/mnsc.30.1.69. URL: http://dx.doi.org/10.1287/mnsc.30.1.69.

Paul Glasserman and Sridhar Tayur. Sensitivity analysis for base-stock levels in multiechelon production-inventory systems. Management Science, 41(2):263{281, 1995. ISSN 0025-1909. doi: 10.1287/mnsc.41.2.263. URL http://dx.doi.org/10.1287/mnsc.41.2.263.

S. C. Graves and S. P. Willems. Supply Chain Design: Safety Stock Placement and Supply Chain Configuration. In A. G. de Kok and S. C. Graves, editors, Supply Chain Management: Design, Coordination and Operation. North-Holland Publishing Company, vol. 11, pp. 95-132. North-Holland Publishing Company, Amsterdam, The Netherlands, 2004.

Stephen C. Graves. A Multi-Echelon Inventory Model for a Repairable Item with One-for-One Replenishment. Management Science, 31(10):1247-1256, 1985. doi: 10.1287/mnsc.31.10.1247. URL: http://dx.doi.org/10.1287/mnsc.31.10.1247.

Stephen C. Graves and Sean P. Willems. Optimizing Strategic Safety Stock Placement in Supply Chains. Manufacturing & Service Operations Management, 2(1):68-83, 2000. doi: 10.1287/msom.2.1.68.23267. URL: http://dx.doi.org/10.1287/msom.2.1.68.23267.

Hau L. Lee and Corey Billington. Material Management in Decentralized Supply Chains. Operations Research, 41(5):835-847, 1993. doi: 10.1287/opre.41.5.835. URL: http://dx.doi.org/10.1287/opre.41.5.835.

O. Ozer and H. Xiong. Stock positioning and performance estimation for distribution systems with service constraints. IIE Transactions, 40(12):1141-1157, 2008.

Y. Rong, Z. Atan, and L.V. Snyder. Heuristics for Base-Stock Levels in Multi-Echelon Distribution Networks. Technical report, Working paper, Lehigh University, Bethlehem, PA, 2015. URL: http://www.researchgate.net/publication/228233865.

Kevin H Shang and Jing-Sheng Song. Newsvendor bounds and heuristic for optimal policies in serial supply chains. Management Science, 49(5):618-638, 2003.

Craig C. Sherbrooke. Metric: A Multi-Echelon Technique for Recoverable Item Control. Operations Research, 16(1):122-141, 1968. doi: 10.1287/opre.16.1.122. URL: http://dx.doi.org/10.1287/opre.16.1.122.

Craig C. Sherbrooke. Vari-metric: Improved approximations for multi-indenture, multi-echelon availability models. Operations Research, 34(2):311{319, 1986. doi: 10.1287/opre.34.2.311. URL http://dx.doi.org/10.1287/opre.34.2.311.

David Simchi-Levi and Yao Zhao. Safety Stock Positioning in Supply Chains with Stochastic Lead Times. Manufacturing & Service Operations Management, 7(4):295-318, 2005. doi: 10.1287/msom.1050.0087. URL: http://dx.doi.org/10.1287/msom.1050.0087.

Kenneth F. Simpson. In-process inventories. Operations Research, 6(6):863{873, 1958. doi: 10.1287/opre.6.6.863. URL: http://dx.doi.org/10.1287/opre.6.6.863.

Loren Troyer, James Smith, Sean Marshall, Elan Yaniv, Sridhar Tayur, Martin Barkman, Alev Kaya, and Yong Liu. Improving Asset Management and Order Fulfillment at Deere & Company's C&CE Division. Interfaces, 35(1):76-87, 2005. ISSN 0092-2102. doi: 10.1287/inte.1040.0110. URL: http://pubsonline.informs.org/doi/abs/10.1287/inte.1040.0110.

\* cited by examiner

MULTI-ECHELON INVENTORY PLANNING UNDER DYNAMIC FULFILLMENT POLICIES

BACKGROUND

The future is unknowable. This uncertainty presents many issues particularly in the field of network inventory planning. If the future was known, the proper number of resources could be acquired and positioned within a fulfillment network today to ensure that an efficient quantity is on hand tomorrow to satisfy the expected demand at various locations. The efficient quantity may represent the point where the amount acquired meets the future needs for each location in a way that maximizesSPE an expected benefit to the acquiring party. The difficulty in estimation is further compounded by dynamic future decisions taken to fulfil demand that depend on the state of the network at the time of fulfillment, causing complex interdependencies in the efficient quantity at different locations in the network, and changes in the fulfillment network (e.g., capacity, connectivity, etc.). Where requests for items can be adjusted, this problem can be mitigated by requesting additional items to meet unexpected demand. However, in some implementations, the ability to perform such course-corrections may not be available.

Current planning may be performed in an ad hoc fashion. The quality and accuracy of an estimate may depend on the ability of an operator to maintain up-to-date notes and provide a "gut" feeling about the item and geographically dispersed user responses thereto. Such planning techniques can lead to either overstocking an item, which may lead to a loss, or understocking an item, which may ignore attainable benefits. Furthermore, where the items are supplied from (e.g., from a vendor, from an internal distribution center, etc.) can also impact the planning and overall availability of an item.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
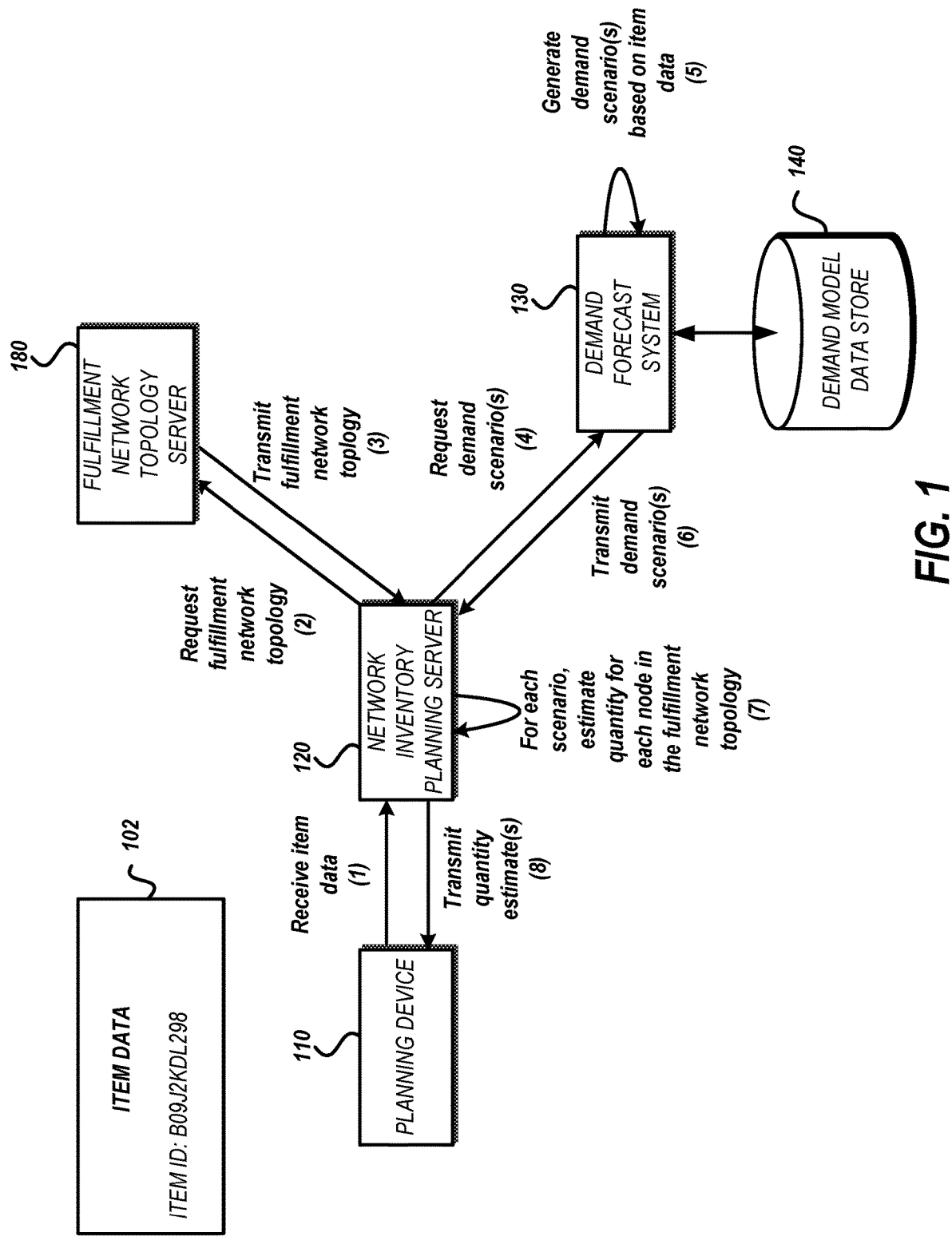
FIG. 1 is a pictorial diagram depicting a data flow of item data for an item, the item data being provided to a network inventory planning server that generates an estimated inventory quantity of the item for respective fulfillment centers.

Generally described, aspects of the present disclosure relate to predictive modeling of inventory amounts of different items in consideration of downstream fulfillment centers and resource constraints for the fulfillment centers. A fulfillment center may refer to a physical location that can receive, store, and distribute an item. Some fulfillment centers may distribute an item to other fulfillment centers. For example, a fulfillment center in location A may redistribute items to fulfillment centers in locations B and C. In this example, the fulfillment centers in locations B and C are considered downstream from location A. More generally the term "downstream" may be used to refer to destinations to which an item is transmitted. Conversely, the term "upstream" may be used to refer to destinations from which an item is transmitted. Using the example locations A, B, and C from above, the fulfillment center in location A may be said to be upstream from the fulfillment centers in locations B and C.

Some fulfillment centers may distribute an item to end users. Still other fulfillment centers may distribute an item to both other fulfillment centers and to end users. As the source of an item can vary within a distribution network, the modeling features described provide a way to account for inventory from intermediate fulfillment centers that can be used to satisfy demand at different locations. The systems and methods described may generate an optimal inventory quantity of each item at each distribution node to maximize a benefit or minimize a cost. At an item level, the features account for transfer costs between fulfillment centers, time to transfer between centers, resource constraints (such as capacity) at each fulfillment center and potential costs to shipping items to end-users under a dynamic fulfillment policy.

Presented herein is a model and algorithm for determining the level of target inventory positions for specific items at specific fulfillment centers (FCs) in a multi-echelon supply chain (e.g., where some FCs hold stock for supplying other FCs). For example, a fulfillment center may be associated with a specific item demand stream for a geographic area. As used herein, the phrase "demand stream" generally refers to a quantity of an item requested by one or more users associated with a geographic area. In some implementations, demand streams may be further distinguished by service level requested for a given item. For physical items, the service level may represent delivery service level. In a packet network, the service level may represent transfer bit rate or network used to move an item through the packet network. One example of a demand stream would be one-day delivery service demand for an item. Table 1 provides examples of demand streams for physical items.

TABLE 1

| Demand Stream | Item | Service Level | Area |
|---|---|---|---|
| 1 | Acme Soap 12 oz. Liquid | In-store Pickup | NYC |
| 2 | Acme Soap 12 oz. Liquid | One-day Delivery | NYC |
| 3 | Acme Soap 12 oz. | Subscription | NYC |

TABLE 1-continued

| Demand Stream | Item | Service Level | Area |
|---|---|---|---|
| | Liquid | | |
| 4 | War and Peace (Hardcover) | Standard Delivery | SEA |
| 5 | War and Peace (Hardcover) | Campus Bookstore | SEA |

Some entities may have multiple, different demand streams for a given item. The fulfillment centers preferably form a distribution network that can satisfy each demand stream so that FCs that transfer inventory from feeder FCs (e.g., FC that distributes to other FCs) can replenish other FCs adequately. In addition, it may be desirable to ensure adequate quantities are obtained from a vendor or supplier of the item to maintain sufficient inventory in feeder FCs for replenishing other FCs.

The specification may refer to inventory planning for physical fulfillment centers for distributing items. The technical features may be applied to other network planning fields such as packet network routing, transportation network routing, or other fields in which distribution nodes can be represented via a multi-echelon network topology.

To provide accurate inventory quantity estimations, it may be desirable to explicitly model the multi-echelon nature of the distribution network. For example, the inventory required at a target FC need only be sufficient to cover demand over the relevant replenishment time from its feeder FC (e.g., quantity on hand until next shipment received from a feeder FC). The quantity should ensure ample stock in the feeder FC to cover demand over a period that includes an item review period (e.g., time to inspect and in-take items from a vendor), vendor lead time (e.g., time to order and receive items), and additional transfer time towards the target FC (e.g., shipping time, facility availability, etc.).

New distribution channels (e.g., same day distribution, direct retail distribution, subscription service, etc.) may increase the variety of demand streams. Further changes in supply chain logistics may also provide a geographically diverse distribution network. In view of such dynamic and potentially complex distribution networks, a multi-echelon solution may be desirable such that adequate inventory targets are maintained for transferring inventory to some FCs while also maintaining adequate supply at feeder FCs. For example, a distribution network may include forward deploy FCs (FDFCs) that can only be supplied from other FCs. If this distribution network expands and FC sizes (e.g., capacity) become smaller, the new FCs may require replenishment from other FCs within the distribution network.

The problem of how much to stock at a feeder FC versus how much to stock at a final destination FC becomes much more complicated in the presence of FC storage-capacity constraints. Included are features for an inventory target setting mechanism for individual items, assuming no capacity constraints. Features are also described to address complexities raised by limited and dynamic storage capacities and address the associated problem of planning for multiple items.

The terms "physical item," "item," and "product" are used interchangeably and refer to physical objects. In a non-limiting example, physical items may include common items made available for purchase electronically or via the Internet, such as apparel, cookware, and physical media (e.g., DVDs or CDs). As used herein, the term "item," in addition to having its ordinary meaning, is used interchangeably to refer to an item itself (e.g., a particular product) and to its description or representation in a computer system, such as a network inventory planning system, or electronic catalog. As will be apparent from the context in which it is used, the term is also sometimes used herein to refer only to the item itself or only to its representation in the computer system.

FIG. 1 is a pictorial diagram depicting a data flow of item data for an item, the item data being provided to a network inventory planning server 120 that generates an estimated inventory quantity of the item for respective fulfillment centers. The item data 102 may include an item identifier (ID) of an item for which quantities will be estimated. The item data 102 may be included in a message received from a planning device 110 by the network inventory planning server 120. In some implementations, the item identifier may be used to acquire the item data 102 such as from a catalog system (not shown). The item data 102 may be received by the planning device 110 through a user interface specifically configured to receive, transmit, and present network inventory planning information.

The network inventory planning server 120 may request fulfillment center information for the item from a fulfillment network topology server 180. The request may include one or more characteristics of the item included in the received item data 102 such as the item identifier or manufacturer of the item. Instead or as an alternative of including in the received item data, the request may include characteristics of the item generated or obtained by the network inventory planning server 120. For example, the characteristics may be retrieved from a catalog system based at least in part on the item identifier.

The fulfillment network topology server 180 may use the information included in the request to identify one or more substitute providers for the item. The fulfillment network topology server 180 may identify fulfillment sources for the item. A fulfillment source may include suppliers (e.g., vendors or manufacturers), receiving nodes that can accept inventory from a supplier and redistribute to another node, intermediate nodes that can redistribute inventory received from other nodes within the network, and destination nodes that can provide inventory to satisfy demand for a specified region. Some nodes may serve multiple roles. For example, a receiving node may also be a destination node for a particular demand stream. In some implementations, the fulfillment network topology server 180 may store the sources for a given item in a data store. In such implementations, the sourcing information may be updated based on a schedule or a triggering event such as availability of a given fulfillment center.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

The network inventory planning server 120 may request one or more forecasted demand scenarios from a demand forecast system 130. The request may include characteristics of the item included in the received item data 102 such as the service level. The request may include characteristics of the item generated or obtained by the network inventory planning server 120. For example, a type for the item may be identified by the network inventory planning server 120 based on a comparison of the item with items included in the catalog system. The request may include temporal information identifying one or more forecast dates (e.g., the time period to which the forecast may pertain). The information included in the request may be used, at least in part, to select one or more forecasting models and as input values to a selected forecast model. The temporal information may be generated based on the fulfillment center information. For example, it may be desirable to provide demand estimates for a period of time that it would take to resupply a node within the distribution network. This time may be generated based on review time for each node along a path to the node being resupplied, transit time along a path to the node being resupplied, or other temporal factor imposed by one or more fulfillment centers in the distribution network.

A forecast model may be a machine learning model trained to receive a set of input values and generate a demand forecast based on the input values. The forecast may include an estimated demand quantity and a probability for the estimate. The forecast model may be trained using training data. The training data may include, for example, input training data based on item attribute information of a number of items, user interactions with the items, as well as result data indicating which items have been purchased by users. The training result data provided to the machine learning model may be split into training data and test data, as is known in the art of machine learning. For example, a certain percentage of the training data may be provided to train a model to assign weights to various item attributes, and then the remaining training data may be used to test the model's prediction capability for demand for the item under the provided forecast input values. The training data results (e.g., estimated demand for the provided forecast input values) may have been initially determined by a retailer, a manufacturer, a distributor, consumer surveys, and/or by other methods.

A forecast model may be associated with assumptions that indicate whether certain input values are more or less influential in the demand forecast. For example, if the item is of an item type that is relatively new, the expected growth in popularity of the item may indicate a more rapid increase in demand than for an item type that has been offered for many seasons. Thus, the inputs to the model related to demand increases may be weighted or adjusted to correspond to the desired scenario.

An item type may refer to one or more attributes information for an item. Example item attributes for a given item, such as a running shoe, may include "Title," "Color," "Size," "Fabric Type," "Brand Name," "Sole Type," etc. An item attribute value is a value associated with a given item attribute. For example, the "Fabric Type" item attribute for a given item, such as running shoes, may have an associated item attribute value of "leather." In some embodiments, an electronic catalog may include the same set of attributes for all items, or for all items in a given item category, but for a given item may only include associated item attribute values for a subset of the item attributes. For example, an item attribute of "Sole Type" may be stored for both a running shoes item and a wristwatch item, but there may be no associated item attribute value stored for the wristwatch item, because, for example, the "Sole Type" attribute is not relevant to a wristwatch. In other embodiments, an item attribute for a given item may only be included in the catalog if an associated item attribute value is also included.

Forecast models may be stored in a demand model data store 140. The forecast models may be indexed to facilitate efficient identification and retrieval of relevant models by the demand forecast system 130. For example, the models may be indexed by item type such that forecast models for an item type can be quickly retrieved based on an identifier of the item type. As another example, the models may be indexed by provider or provider type. For example, the forecast model for a marketplace level 1 provider may be different than the forecast model for a third-party provider of the same item. In such instances, the request may include information identifying the substitute providers received from fulfillment network topology server 180.

The demand forecast system 130 may receive the request for the demand scenarios. Using the information included in the request, the demand forecast system 130 may identify one or more demand models included in the demand model data store 140 and generate the demand scenario(s) based on the item data. A demand scenario may include multiple demand streams for the item. One example of a demand stream is one-day delivery service demand for an item. Demand streams may also be associated with a specific geographic area (e.g., New York City). In such instances, the demand scenario may provide estimated demand for the item at the given service level within the geographic location area.

The network inventory planning server 120 may then estimate an inventory quantity for each fulfillment distribution network node along a path from the supplier to the distribution node that satisfies the demand scenario(s). The estimated inventory quantities may include consideration of inventory held within the distribution network that can be reallocated to another FC within the distribution network thereby reducing excess inventory within the network. Further details of the estimation process are provided below.

The estimated inventory quantities may be transmitted from the network inventory planning server 120 to the planning device 110. The transmission may include a message that initiates a display of a user interface to present the estimated inventory quantities. In some implementations, the transmission may include information about the demand scenario used to generate the estimated inventory quantities. In some implementations, the transmission may cause display of a map of the network and the associated quantity estimates.

The transmission may be a one-time transmission, such as in response to receiving the item data. In some implementations, it may be desirable to monitor the demand forecast system 130 to identify updates in the models used to generate estimates. In such instances, upon detecting an update to a model, the network inventory planning server 120 may re-estimate the quantities for an item. If a re-estimated inventory quantity differs from an original estimate or the difference is above a threshold, the network inventory planning server 120 may initiate transmission of a message to the planning device 110 that received the original estimate. For example, the original estimate may be stored by the network inventory planning server 120 along with contact information for the planning device 110 (or user associated therewith). Using stored contact information stored, the network inventory planning server 120 may transmit a message including the updated estimate to the planning device 110. In some implementations, the threshold may include a number of FC estimates that changed. In such implementations, it may be tolerable to avoid reassigning estimates for the entire network if a predetermined number of FC estimates (e.g., one, two, or five) have a difference that exceeds a difference threshold. But if more than the predetermined number differ, it may be desirable to reassign the estimates. In some implementations, the threshold for regenerating estimates may be an aggregated difference for the network. For example, if the total difference between the original estimates and revised estimates exceed an aggregate threshold, the revised estimates may be applied.

In some implementations, it may be desirable to monitor the fulfillment network topology server 180 to identify changes in the available network nodes or operational characteristics of network nodes included for a given estimate. In such instances, upon detecting a change to a node (e.g., new node added, node becomes unavailable, change in node resources, etc.), the network inventory planning server 120 may request updated demand scenario(s) for at least one of the changed nodes and re-estimate the FC quantities for an item. If one or more of the re-estimated inventory quantities differs from the original estimates or one or more differences between the re-estimated inventory quantity and the original estimate is above a threshold, the network inventory planning server 120 may initiate transmission of a message to the planning device 110 that received the original estimates. For example, the original estimates may be stored by the network inventory planning server 120 along with contact information for the planning device 110 (or user associated therewith). Using stored contact information stored, the network inventory planning server 120 may transmit a message including the updated FC estimates to the planning device 110.

Figure 2:
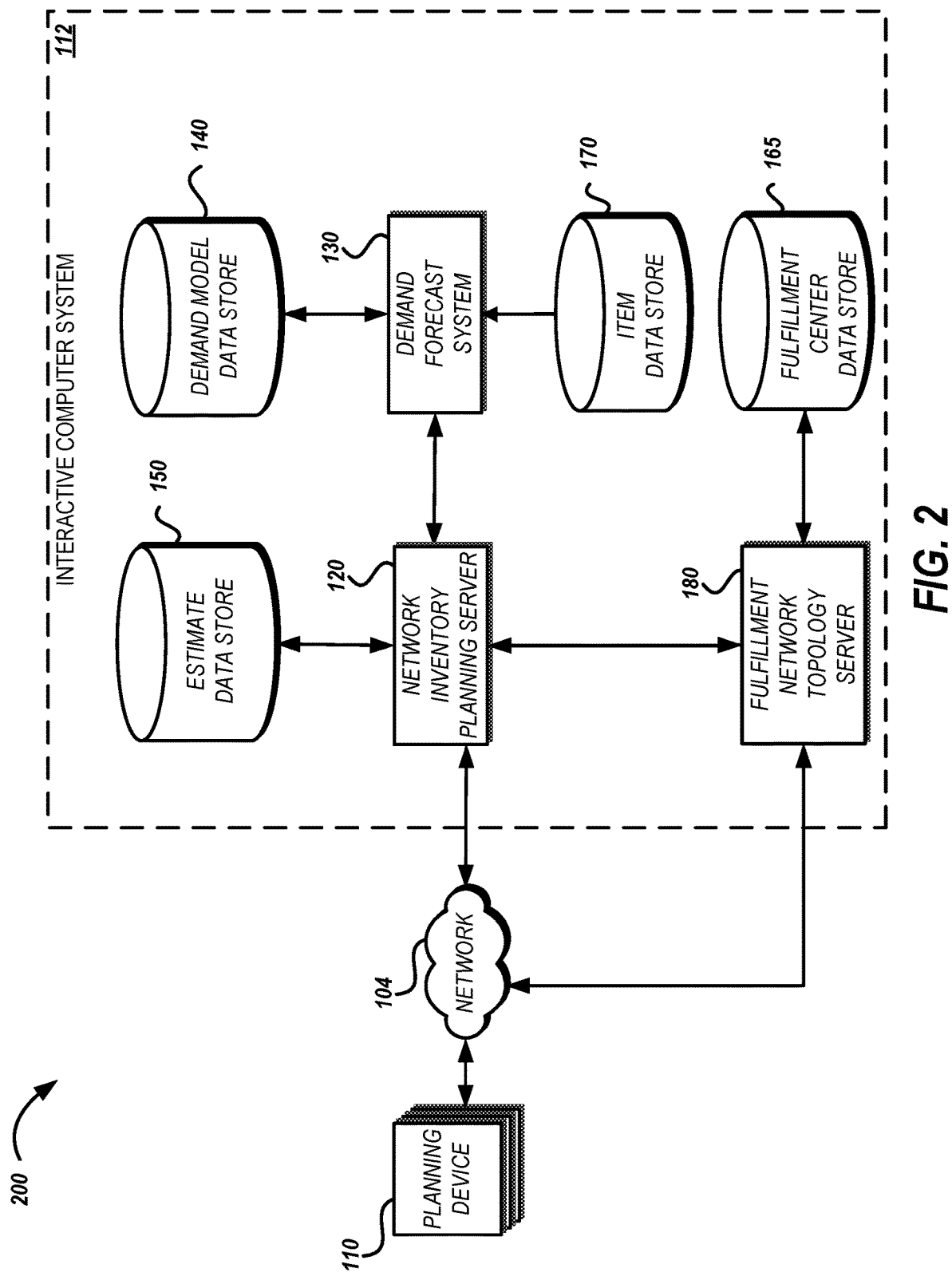
FIG. 2 is a block diagram depicting an illustrative operating environment for generating estimated inventory quantities of an item for respective fulfillment centers.

FIG. 2 is a block diagram depicting an illustrative operating environment for generating estimated inventory quantities of an item for respective fulfillment centers. In the environment shown in FIG. 2, a user of the environment 200 may include a planning device 110 to communicate with the network inventory planning server 120 via a communication network 104. The planning device 110 can include, for example, computing devices, such as desktop computers, laptop computers, tablets, personal digital assistants (PDAs), mobile phones, electronic book readers, other wireless handheld devices, set-top or other television boxes, media players, video game platforms, kiosks, glasses or other wearable devices, or any other device with a hardware processor.

The network 104 may be any wired network, wireless network, or combination thereof. In addition, the network 104 may be a personal area network, local area network, wide area network, cable network, satellite network, cellular telephone network, etc. or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or some other type of wireless network. The network 104 may use protocols and components for communicating via the Internet or any of the other aforementioned types of networks.

The planning device 110 may present a network inventory planning interface that includes control elements to receive data inputs for network inventory planning. Example data inputs may include item data such as the item data 102 shown in FIG. 1. The user interface may include a control element that, when activated, causes submission of a message requesting an estimate to the network inventory planning server 120. The request may include a value indicating whether the request is a one-time request or an ongoing request (e.g., subscription) for estimates. If the request is for a one-time estimate, the network inventory planning server 120 may generate estimates for FCs as discussed with reference to FIG. 1 and in further detail below. The generated estimates may then be returned as a response to the request to the planning device 110. If the request is for ongoing estimates, the network inventory planning server 120 may save information identifying the planning device 110 and/or user requesting the estimates. As estimates are generated, the network inventory planning server 120 may transmit the FC estimates to the planning device 110 or another device associated with the user requesting the estimates. In this way, the planning device 110 may subscribe to real-time updates to the FC estimates based on the most recent models and inputs (e.g., weather predictions, user profiles, item assortment, etc.).

The requests received by the network inventory planning server 120 and/or the estimates provided may be stored in an estimate data store 150. The estimate data store 150 may be a specially architected memory device configured to store network inventory planning estimates. The information may be indexed by one or more of: an identifier of the planning device (e.g., IP address, media access control (MAC) address, mobile equipment identifier (MEID), etc.), an identifier of the item under estimation, an identifier of the fulfillment center, an identifier for the demand stream, and a user identifier (e.g., user name, user ID, etc.) associated with an estimate. The estimate data store 150 may store an estimate date associated with an estimate. The estimate date may indicate when the estimate was generated. The estimate date may be used to schedule subsequent processing for estimate subscription. For example, the network inventory planning server 120 may include a threshold indicating how often the server 120 should determine if new models are available. If the amount of time elapsed since the estimate date exceeds the threshold, the network inventory planning server 120 may initiate re-estimation for the item.

Whether generating a new estimate or re-estimating, the network inventory planning server 120 may communicate with the demand forecast system 130 to obtain one or more demand forecast scenarios. The demand model data store 140 may be included to store the trained forecast models as discussed with reference to FIG. 1. As shown in FIG. 2, the demand forecast system 140 may also receive information from the item data store 170. The item data store 170 may include information about different items such as identifiers, item type, inventory quantity, current price, pricing history, and user interactions with particular items. A user interaction with an item may include browsing, viewing, downloading, submitting a comment, ranking, rating, adding to a wish list, adding to a shopping cart, installing, or purchasing the item. Item data or user interactions with an item may be performed via a catalog server (not shown) and stored in an item data store 170. Examples of catalog servers and systems are described in greater detail, e.g., in U.S. Pat. Nos. 7,685,074; 7,472,077; and 8,122,020, each of which is incorporated herein by reference in its entirety.

As shown in FIG. 2, the item data store 170 is included in the interactive computer system 112. However, it will be appreciated that the fulfillment network inventory planning elements (e.g., network inventory planning server, demand forecast system, associated data stores, etc.) may be implemented separately from the item data store 170.

As discussed with reference to FIG. 1, the network inventory planning server 120 may communicate with the fulfillment network topology server 180 to obtain information regarding available fulfillment centers for an item. The fulfillment network topology server 180 may generate a distribution network a based at least in part on a set of available fulfillment centers identified from a fulfillment center data store 165. For example, the fulfillment center data store 165 may include four different fulfillment centers. Each fulfillment center may be associated with a demand stream. Some may be capable of providing the item to a downstream fulfillment center. Because these FCs may be organized in a variety of ways to ensure satisfaction of all demand scenarios, it may be desirable to identify an "optimal" network. The optimal network may be identified based on the transfer cost for a network (e.g., configuration that provides the lowest overall or average transfer costs). The optimal network may be identified based on the transfer time for a network (e.g., configuration that provides the lowest overall or average transfer times). The optimal network may be identified based on additional factors, alternative factors, or a combination of factors.

Figure 3:
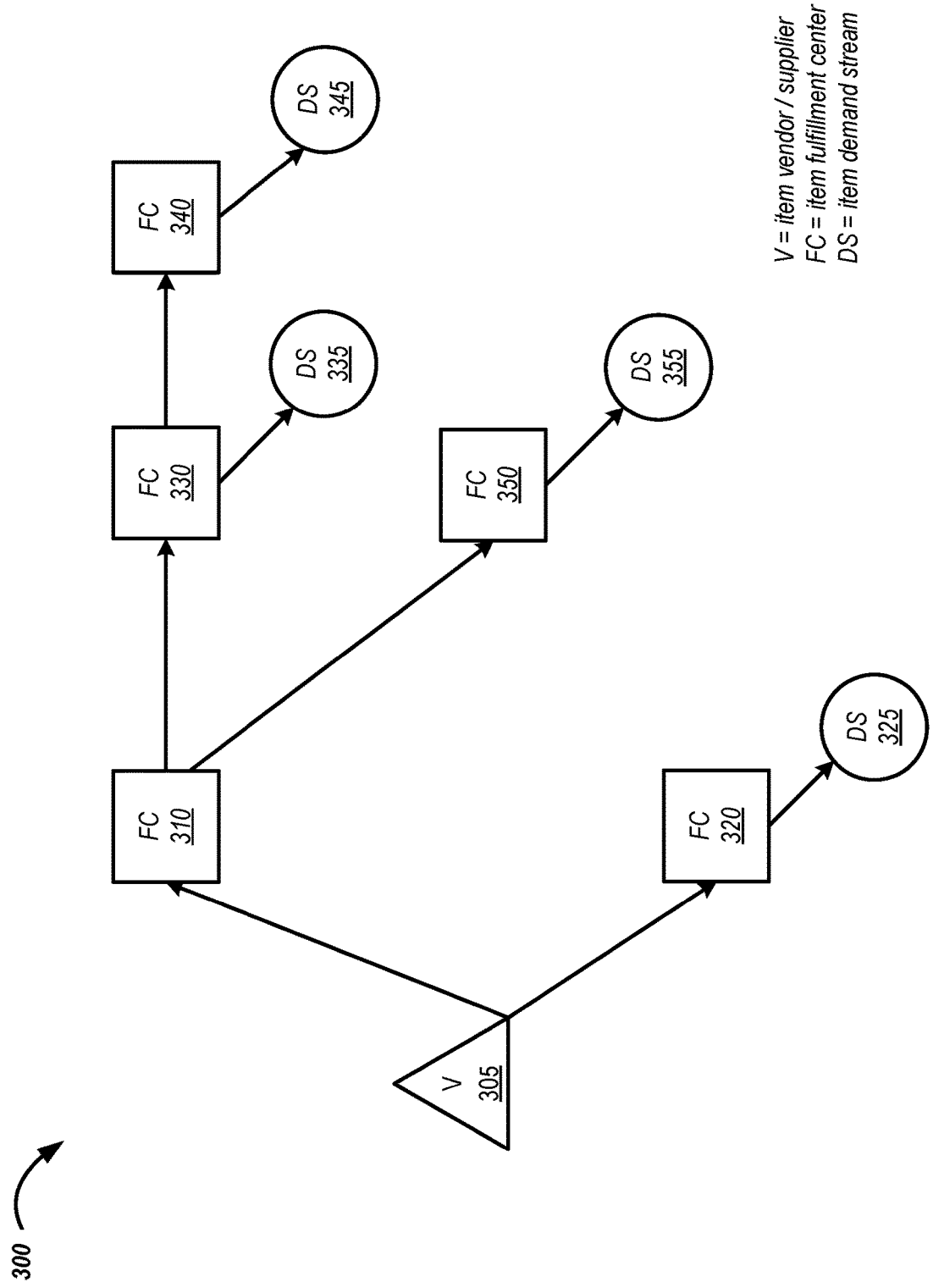
FIG. 3 is a tree diagram depicting an illustrative distribution network for several item demand streams.

FIG. 3 is a tree diagram depicting an illustrative distribution network for several item demand streams. FIG. 3 illustrates one network that may be generated by the fulfillment network topology server. Fulfillment center information may be generated and transmitted by the fulfillment network topology server in a structured format such as the tree structure shown in FIG. 3. Each path may be associated with a respective cost (e.g., time, transfer cost, etc.). The network 300 may be the organization of nodes that represents the lowest cost(s). Each node in FIG. 3 may represent a fulfillment center, a supplier, or a demand stream.

The network 300 includes one source node 305. This source node 305 can provide item inventory to two nodes (e.g., node 310 and node 320). The source node 305 may be considered upstream from the two receiving nodes 310 and 320. Conversely, the receiving nodes 310 and 320 may be considered downstream from the source node 305. Node 310 is not associated with any demand stream and can provide (e.g., redistribute) at least a portion of its inventory to nodes 330 and 350. Node 330 services a second demand stream 335 as well as providing at least a portion of its inventory to node 340. Node 340 is associated with a third demand stream 345. Additional FC nodes and demand stream nodes are also shown in FIG. 3. It will be understood that additional nodes may be included, in alternate configurations, with more or fewer paths between and among the nodes. It will also be understood that the network 300 represents a supply chain for one item and that when considering multiple items, each item may be associated with a different distribution network of a subset of paths through a common distribution network which may share nodes with the network 300.

The environment 200 is depicted in FIG. 2 as a distributed computing environment including several computer systems that are interconnected using one or more computer networks. The interactive computer system 112 could also operate within a computing environment having a fewer or greater number of devices than are illustrated in FIG. 2. Thus, the depiction of interactive computer system 112 in FIG. 2 should be taken as illustrative and not limiting to the present disclosure. For example, the interactive computer system 112 could implement various Web service components and/or peer to peer network configurations to implement at least a portion of the processes described herein.

Figure 4:
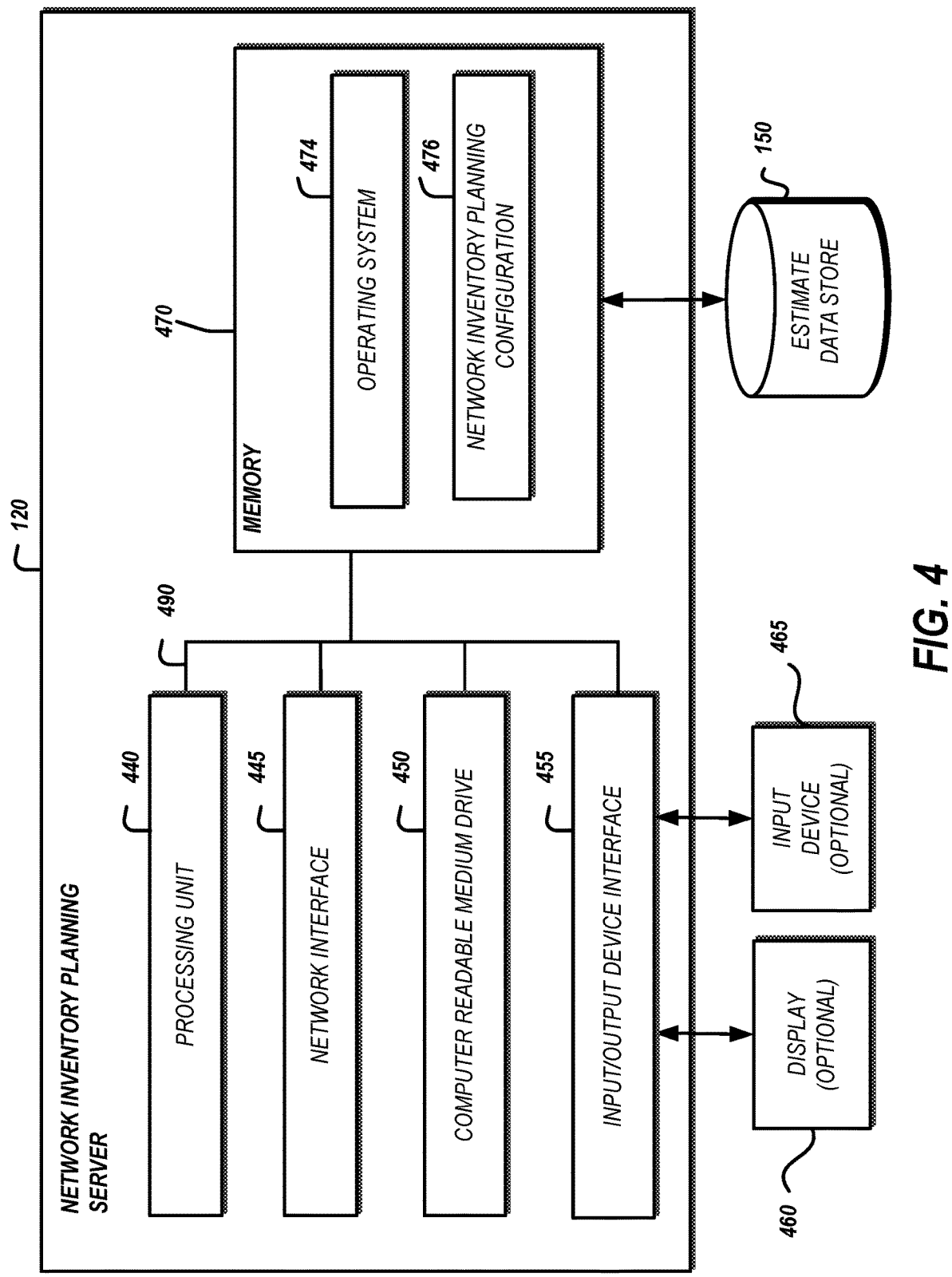
FIG. 4 is a block diagram depicting an illustrative architecture for a computing device providing network inventory planning services.

FIG. 4 is a block diagram depicting an illustrative architecture for a computing device providing network inventory planning services. The network inventory planning server 120 can be a server or other computing device, and can comprise a processing unit 440, a network interface 445, a computer readable medium drive 450, an input/output device interface 455, and a memory 470. The network interface 455 can provide connectivity to one or more networks or computing systems such as the network 104 shown in FIG. 2. The processing unit 440 can receive information and instructions from other computing systems or services via the network interface 445. The network interface 445 can also store data directly to memory 470. The processing unit 440 can communicate to and from memory 470 and output information to an optional display 460 via the input/output device interface 455. The input/output device interface 455 can also accept input from the optional input device 465, such as a keyboard, mouse, digital pen, microphone, mass storage device, etc.

The memory 470 generally includes RAM, ROM, and/or other persistent, non-transitory computer readable media. The memory 470 can store an operating system 474 that provides computer program instructions for use by the processing unit 440 or other elements included in the computing device in the general administration and operation of the network inventory planning server 120. The memory 470 can further include computer program instructions and other information for implementing aspects of the present disclosure.

For example, in one embodiment, the memory 470 includes a network inventory planning configuration 476. The network inventory planning configuration 476 may include thresholds or predetermined values to support the network inventory planning operations, such as estimating item quantities, described herein. The network inventory planning configuration 476 may store specific values for a given configuration. For example, the threshold for determining when to check for new forecast models or substitute providers may be specified as an absolute value (e.g., every day, week, 10 days, etc.). The values may be provided in a look up table indexed by one or more characteristics of an item or fulfillment center such as item type (e.g., book, music, movie, clothing), fulfillment center type (e.g., receiving node, destination node, intermediate node, urban, suburban, rural, service level (e.g., one-day fulfillment, long-term storage, etc.)), or an identifier for the item or fulfillment center.

Rather than storing express values for a particular configuration element, the network inventory planning configuration 476 may, in some implementations, store information that allows the network inventory planning server 120 to obtain a dynamically generated value for the given configuration element. For example, the identity of the default demand forecast system may be specified as a network location (e.g., URL) in conjunction with username and password information to access the network location to obtain the default demand forecast system that should be used by the network inventory planning server 120.

The memory 470 may also include or communicate with one or more auxiliary data stores, such as the estimate data store 150. The estimate data store 150 may electronically store data regarding estimates generated by the network inventory planning server 120, planning devices to notify in the event of a revised estimate, and the like.

The elements included in the network inventory planning server 120 may be coupled by a bus 490. The bus 490 may be a data bus, communication bus, or other bus mechanism to enable the various components of the network inventory planning server 120 to exchange information.

In some embodiments, the network inventory planning server 120 may include additional or fewer components than are shown in FIG. 4. For example, a network inventory planning server may include more than one processing unit 440 and/or computer readable medium drive 450. In another example, the network inventory planning server 120 may not be coupled to a display (e.g., the display 460) or an input device (e.g., the input device 465). In some embodiments, two or more network inventory planning servers may together form a computer system for executing features of the present disclosure.

Figure 5:
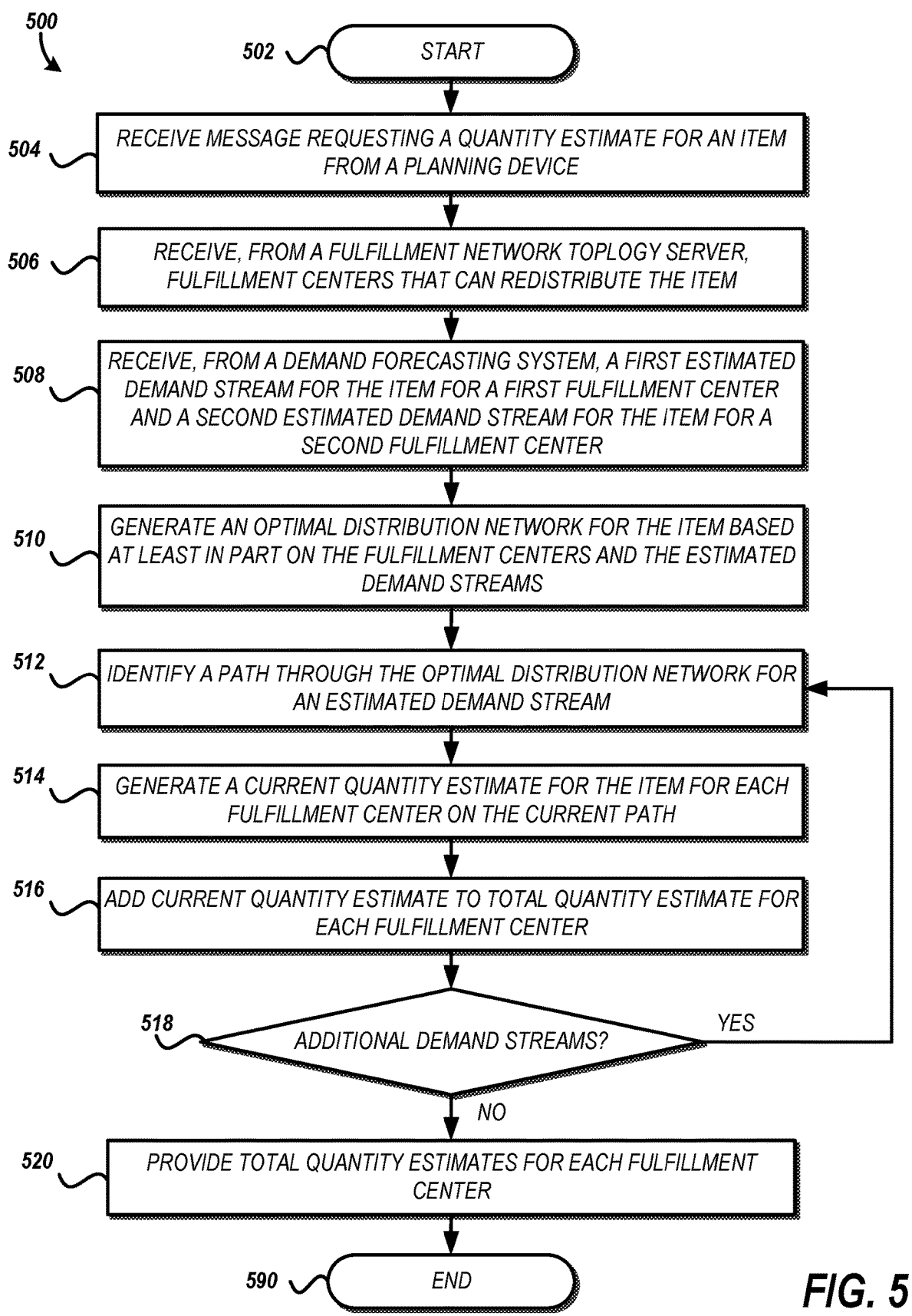
FIG. 5 is a flow diagram depicting an illustrative method of estimating inventory quantities of an item for respective fulfillment centers.

FIG. 5 is a flow diagram depicting an illustrative method of estimating quantities of an item for respective fulfillment centers. The method 500 may be implemented in whole or in part by one or more of the devices described herein, such as the network inventory planning server 120 shown in FIG. 1, FIG. 2, or FIG. 4. The method 500 generates inventory estimates for an item across a set of fulfillment centers that is sufficient to satisfy a forecasted demand for the item.

The method 500 shown in FIG. 5 can generate an estimated inventory quantity for a single item for multiple fulfillment centers. A distribution network may specified by a set of FCs ($\mathcal{F}$) which includes a subset ($\mathcal{L} \subset \mathcal{F}$) which may be designated as receiving nodes that can receive shipments from a vendor or other supplier of the item. The distribution network may be further characterized by a set of demand streams ($\mathcal{R}$) for the item under consideration, a shipping cost $s_{i,j}$ to serve demand stream j which is an element of the set of demand streams ($\mathcal{R}$) from FC i. The distribution network may also include transfer arcs between FCs, each arc being associated with a transfer lead time and cost.

The method 500 includes a decomposition approach that provides certain advantages. For example, estimated inventory quantities can be computed through one pass through the distribution network, from leaf nodes to roots, setting targets one FC at a time. This provides efficient generation of the estimates. This also allows aspects of the method to scale for extended use such as in a multi-item implementation with FC capacity constraints as discussed in further detail herein.

The method 500 begins at block 502. At block 504, a network inventory planning server may receive a message requesting an estimate for an item. The message may be received from a planning device such as the planning device 110 shown in FIG. 1. The request may include information identifying an item such as an item identifier.

At block 506, the network inventory planning server may receive information identifying fulfillment centers that can redistribute the item from a fulfillment network topology server. The redistribution may include receiving the item from a supplier (e.g., vendor) or another fulfillment center, storing the item, and providing the item to satisfy a demand stream or to another fulfillment center. The information may be presented as a list of fulfillment centers and include information about each fulfillment center such as capacity, geographic location, etc.

At block 508, the network inventory planning server may receive a first forecasted demand stream for the item for a first fulfillment center and a second forecasted demand stream for the item for a second fulfillment center. The demand forecasts may be obtained based on one or more characteristics of the item (e.g., the item type, the unit cost, a configuration of the item, service level, a physical location of the item, a manufacturer of the item, a condition of the item, or other property of the item or listing thereof). In some implementations, the demand forecast may be based on a parameter detected by or via the network inventory planning server such as weather conditions, user demographics, date/time information, and user activities on a catalog system.

A demand forecast may identify, for a set of parameters, a quantity of demand for an item. In some implementations, the demand forecast may include a probability indicating a confidence in the quantity. If the probability is low, then the confidence that the quantity forecast will be the actual demand is less likely than for a forecast with a high probability of occurring. The network inventory planning server may obtain the demand forecast from a demand forecast system such as the demand forecast system 130 discussed above.

In FIG. 5, one demand forecast is obtained. However, it will be appreciated that multiple demand scenarios may exist. A demand scenario generally refers to a set of parameters and the demand model used to generate a demand forecast. For example, one demand scenario for winter coats may include the detectable parameter of an average temperature of 12 degrees while a second demand scenario may use an average temperature of 57 degrees. The demand for coats in each scenario would likely be different to account for increased demand due to the severe weather in the first scenario as compared to the more mild weather in the second scenario. The scenarios or selections of parameters for identifying specific scenarios may be identified in the message received at block 504.

At block 510, the network inventory planning server or the fulfillment network topology server may generate an optimal distribution network for the item based at least in part on the fulfillment centers identified at block 506 and the first and second forecasted demand streams received at block 508. The optimal network may be the configuration of nodes that minimizes total cost for satisfying a demand stream. For example, the cost may be measured as transportation cost between nodes or time to transfer between nodes. In a computing network implementation, the cost may depend on the network used for transferring the item (e.g., public network, private network, metered network). In some implementations, the network generation at block 510 may include solving a shortest path problem to obtain a preferred distribution network for the item, with the network. The shortness of a path may be measured based on one or more of: cost, time, distance, number of nodes, or the like.

Having identified a distribution network that satisfies the forecasted demand streams, at block 512 a first serial network representing a path from a source root node to a destination FC for a demand stream is identified. The path may be identified based in part on the number of nodes included in the serial network. In some implementations, the identification may include finding the path for a demand stream that has the most FC nodes.

A serial supply chain is one example of a network topology that has been considered in multi-echelon networks. A serial supply chain generally includes a source node representing a vendor or other supplier of the item. The source node may provide items to a receiving node. In some implementations, the receiving node may be referred to as an inbound cross-dock center. The serial supply chain may also include a destination node. The destination node represents the last stop for an item before being provided to end users for a demand stream. The demand stream represents aggregated demand for an item within an area served by the destination node at a particular service level (e.g., one day delivery, overnight delivery, physical exchange locations, subscription services, scheduled delivery service, and the like). Between the receiving node and the destination node, the serial distribution network may include one or more intermediate nodes. An intermediate node may represent a fulfillment center through which an item may traverse en route to the destination node. An item may not traverse the supply chain without cost. For example, there is transit time and expense associated with moving an item from a first node to a second node.

At block 514, a current quantity estimate for the item for each fulfillment center on the path identified at block 512 is generated. Within a serial supply chain, planning accurate inventory positions for each node is a complex operation due to the variety of possible assumptions, e.g. in cost structures (fixed or linearly varying), ordering policies (one-for-one, batch, state-dependent), end-user behavior (backorder or lost sales), inter-facility replenishment policies, transshipment policies etc. leading to a large set of possible decisions. A truly optimal stocking, ordering, and replenishing policy may be unknown for such a widely general set of assumptions, and is unlikely to be found in time to make a relevant allocation.

Some systems focus on simplifying the models and assumptions to implement approximately optimal policies. Two frameworks for determining target inventory positions in a multi-echelon network are the guaranteed service approach (GS) and the stochastic service approach (SS). Two variations of the stochastic service approach include the Clark and Scarf-type approach (SSCS) based on what are called echelon stock policies, and the METRIC-type approach (SSM) based on what are called installation stock policies.

GS models take the perspective that safety stocks at each stage (FC) should be maintained to cover a reasonable amount of demand variability (e.g., corresponding to a desired stockout probability at the end-user-facing stage in a network), but not to respond to larger deviations. When large deviations occur, countermeasures beyond safety stock may be employed, such as through expediting, to guarantee stock availability. With this perspective, each stage in the supply chain may be assigned a service time from its upstream stages, after which it receives its ordered replenishment with certainty. Similarly each stage assigns a service time to its end-user stages, after which it satisfies its end-users' demand with a specified stockout probability. A stockout probability generally refers to a probability that an item will be available to satisfy a user request. In some systems, the planning may begin with stockout probability and attempt to meet a target probability. In contrast, the features for dynamic network inventory placement consider the costs and benefits of inventory stocking levels to allocate inventory across the network. As such, the quality of a fulfillment network inventory allocation can be measured based on stockout events rather than driven by a probability of a stockout.

SS models take the perspective that inventory is the only countermeasure stages can use to offer the desired service level, in case any of their own supply stages stockout. Thus each stage may suffer a stockout and consequently its downstream stages may suffer a delay in their replenishments. The possibility of upstream delay must be accounted for by a stage when computing the service level for its downstream end-users. One of the main challenges in this approach is computing the delays in networks of stages.

Among SSCS models, some implementations include a dynamic programming approach to determining stocking levels directly, by accounting for upstream delays. For a serial supply chain with common review periods at each stage, backordered demand, linear holding costs, and a specific replenishment policy (e.g., that ships the minimum of on-hand stock and demanded quantity from a stage), the main result of such models is structural: that an echelon stock policy is optimal for this problem. That is, the order-up-to level at a stage should account for the inventory for that stage (on-hand and on-order to) and the entire downstream inventory in the network (in-transit and on-hand). But this result has limited uses because the solution to the dynamic program is computationally difficult to obtain. Furthermore, the solution itself remains a black box (e.g., it is not clear how the optimal echelon stocking levels are related to each other or how they are related to the key parameters of the problem). Heuristics that can approximate the optimal solution may be included to address these issues and reveal relationships between key model parameters and the optimal solution. These heuristics however are limited to providing solutions only for serial networks, not dynamic fulfillment networks with multiple and/or alternative sources of an item that may be represented with complex interactions such as a hierarchical tree structure. Furthermore, the heuristics do not consider resource constraints within the fulfillment network such as fulfillment center capacity for stocking heterogeneous assortments of items.

Given the complexity of determining echelon stocking levels, SSM models may be used to develop alternative approximations. Models that can handle more realistic networks may include expressions for inventory levels at each stage in the network, such as by approximating the delays at upstream stages. A key performance measure for a given stocking level (under an assumption of upstream stockouts), is the service level (e.g., stockout probability) it can provide to its downstream stages.

SSM and GS models generally develop expressions for safety stocks at each stage in a multi-echelon network, by specifying relationships between the different stages. Once the expressions are developed, both models typically express a network-wide an optimization problem to determine how these stocks should be distributed among different stages. For example, SSM models may optimize internal service levels in the network while GS models may optimize service times. However, the SSCS dynamic programming approach cannot be scaled to provide accurate and timely estimates for large distribution networks with heterogeneous demand streams across thousands or millions of items. To implement SSSM or GS models would require formulating single-item network-wide optimization problems, each considered in isolation. This will add computational complexity to the planning process but does not address a key constraint, namely the capacity constraint for each node in the supply chain. Thus, when the model needs to consider millions of items jointly, solving single-item network-wide optimization problems as subroutines will not be feasible due to the time and resources needed to generate target quantities for each item at each node within the supply chain.

The features described may determine a target inventory position ($\tilde{y}_i$) for each FC i that maximize an expected network benefit. The network benefit may be measured as a revenue or profit. In some implementations, the benefit may be expressed as a capacity measurement such as total space utilization, number of items processed, transfer resource utilization, or the like. In some implementations, the benefit may refer to a computing resource of an electronic device such as power, bandwidth, or memory.

The estimated inventory quantity for each FC may be referred to as an echelon target. The quantity for FC i ($y_i$) represents a total target inventory of an item held in FC i and the FCs downstream from it, including on-hand inventory, all inventory in transit from FC i's parent to FC i, and inventory in transit between downstream FCs. At any given review period, an inventory transfer from FC (i−1) to FC i may be triggered if the echelon inventory position at FC i falls below the echelon target $y_i$, with a transfer amount equal to the difference between these quantities (or to the on-hand at FC (i−1), if the latter is smaller).

At block 514, to generate the current quantity estimate, the method 500 may differentiate between the types of node under estimation. For example, a destination node may face different constraints than a receiving node due to their proximity to the end-user and demand streams for the same. The destination nodes may be the most downstream or "leaf" FC in the distribution network, and assume that the number of nodes in the network (n) is greater than 1 such that the destination node can be internally resupplied from another node within the distribution network.

To generate a target inventory position at FC n, this FC may be modeled as receiving inventory from its supplier node, FC (n−1), at a certain cost. With this assumption, a benefit maximization problem may be solved for the destination node for a single time period. The relevant planning horizon for benefit maximization problem is the transfer lead time from FC (n−1) plus the review period at FC n. In some implementations, review time may be a predetermined period of time such as one day. In some implementations, the review time may be dynamically generated based on factors such as current capacity, available resources, aggregate incoming volume, or other detectable parameter of the fulfillment center. Given that this planning horizon may be short (e.g., a few days), it may be assumed that the optimal inventory target at FC n will remain constant over this period. Any left-over inventory at the end of the planning horizon may be associated with a salvage value equal to the full procurement cost perceived by FC n. Under such models, targets for the destination nodes may be identified that are large fractiles of the overall demand distribution over this planning horizon.

For instance, let D(t) denote the demand for an item from the demand stream under consideration during the time interval (0, t], and $F_{D(t)}(\cdot)$ denote customer demand forecast for the item during time t. Let $\widetilde{\ell}_{ik}$ and $t_{ik}$ represent, respectively, the transfer lead time and transfer cost between FC i and FC k. Also let $s_i$ denote the unit shipping cost to serve this demand stream from FC i, and $h_i$ denote the unit holding cost at FC i. The total transfer cost from the receiving node to the current node (i) may be denoted by t→i.

The inventory target at FC n may be generated by solving an expectation problem for the given demand stream that may consider: (i) a level that provides a benefit to the FC n; (ii) any reduction in the benefit due to overstocking; and (iii) any benefit from spillover demand that can be fulfilled in a timely manner from an upstream fulfillment center. The spillover demand may be demand for another fulfillment center or demand for a group of end users (e.g., demand within a geographic region). Equation (1) provides one expression of such an expectation problem.

$$\max_{y \geq 0} g(y|n) = (p + \Lambda - c - t_{\to n} - s_n) E\min(y, D(l_n)) -$$
$$h_n l_n E(y - D(l_n))^+ +$$
$$\delta(p + \Lambda - c - t_{\to(n-1)} - s_{n-1}) E(D(l_n) - y)^+.$$

EQUATION 1

In Equation (1), p, Λ, and c may represent the selling price, customer in-stock value (e.g., benefit of having the item in inventory), and a procurement cost (e.g., to the inbound node) for this item and demand stream, respectively. The parameter δ equals 1 if the demand stream can be satisfied via upstream fulfillment centers and zero otherwise. Note the first term in g(y|n) corresponds to the expected benefit, the second term represents inventory holding costs, and the last term to sales profit from spillover demand that is assumed to be fulfilled from upstream fulfillment centers.

Another expression of the expectation problem in the form of a newsvendor problem is shown in Equation (2).

$$\min_y c_u E(D - y)^+ + c_o E(y - D)^+ + \alpha y$$

EQUATION 2

Because the decision as to a fulfillment center may receive an item from an upstream node is a binary decision, the demand may be generalized to streamline the expectation problem. For example, Equation (2) may be simplified by setting $D=D(l_n)$, $c_o=h_n l_n$, $\alpha=0$, and $c_u = s_{n-1} - s_n - t_{n-1,n}$ if δ=1, or $c_u = p + \Lambda - c - t_{\to n} - s_n$ if δ=0. One example of such a streamlined expression is shown in Equation (3).

$$y = F_D^{-1}\left(\frac{c_u - \alpha}{c_u + c_o}\right)$$

EQUATION 3

At block 514, the echelon target $y_n$ at FC n may be generated according to the expression of Equation (3). The target $\widetilde{y_n}$ equals the echelon target, since there are no more FCs downstream.

Once the leaf nodes have an assigned inventory quantity, the method 500 at block 514 may continue traversing the intermediate nodes to generate cumulative targets sufficient to satisfy any demand stream satisfied through the node and any spillover to downstream nodes. The quantity may be generated similar to the estimates for leaf nodes. If the demand stream cannot be provided to the intermediate node from an alternate node, an estimated target may be generated in a similar fashion as the quantity for a leaf node (e.g., Equation (1) or (4)).

If the demand stream can be provided to the intermediate node from at least one alternate node, it may be desirable to consider two different constraint scenarios: (1) salvage and lag at the node; and (2) salvage and lag at the leaf node. For example, using Equation (1), a first value may be generated by setting t to the lag time to the node and s to the salvage value at the node. A second value may be generated using Equation (1) by setting t to the lag time to the destination node and salvage value to the salvage value at the destination node. A final quantity estimate can then be generated based at least in part on the two values. For example, the first values and the second value may be averaged.

The target inventory estimate for an intermediate node may include inventory quantities that will be distributed to a downstream node. Accordingly, it may be desirable to assign the final inventory for the node that excludes any inventory assigned to the downstream node. For fulfillment center i, this may be expressed as $(y_i - y_{i+1})+$.

A third type of node that can exist in the supply chain is a receiving node. As discussed, the receiving node may be the node that receives items from a vendor or other supplier.

Similar to the quantity estimates generated for intermediate FCs, to generate a quantity estimate for a receiving node, the serial network from the receiving node to downstream nodes may be collapsed into a single FC. In the collapsed form, different candidate echelon targets may be generated at this node based on different specification of the costs. The different scenarios may be combined (e.g., averaged) to generate the final echelon target. One difference between an intermediate node estimate and receiving node estimate is that, for a single item estimate with assumed infinite capacity, estimating quantities for a receiving node may explicitly use the distribution of the random planning horizon. The estimation may depend on a salvage value function r. The salvage function may be a non-linear function such as a net present value function. Otherwise, the receiving node inventory estimate may be generated using a similar process as applied for the intermediate node quantities.

The time at which the item may be available for distribution from a receiving node to another node in the network may be based on a review period (RP) at the receiving node to inspect received items, a period of time for the supplier to provide the items ($L_o$), and a transit time between the receiving node and the next node in the network ($l_{o,1}$). The quantity at the receiving node may be expressed as shown in Equation (5).

$$\max_{y \geq 0} g(y \mid n) = (p + \Lambda - c - t - s) E \min(y, D(L_{1 \rightarrow})) - $$
$$E(c + t + hL_{1 \rightarrow})(y - D(L_{1 \rightarrow}))^+ + Er(y - D(L_{1 \rightarrow}))^+. \quad \text{EQUATION 5}$$

If the demand stream cannot be provided to the receiving node from a source, an estimated target may be generated using Equation (5), where t is set to the lag time through the leaf node and s is set to the salvage value through the leaf node.

If the demand stream can be provided to the receiving node from at least one alternate source, it may be desirable to consider two different constraint scenarios: (1) salvage and lag at the receiving node; and (2) salvage and lag at the leaf node for the demand stream. For example, using Equation (5), a first value may be generated by setting t to the lag time to the receiving node and s to the salvage value at the receiving node. A second value may be generated using Equation (5) by setting t to the lag time to the destination node and salvage value s to the salvage value at the destination node. A final quantity estimate can then be generated based at least in part on the two values. For example, the first values and the second value may be averaged.

The target may include inventory that will be distributed to a downstream node. Accordingly, it may be desirable to assign the final inventory amount for the receiving node that excludes any inventory assigned to the downstream node. For fulfillment center 1, this may be expressed as $(y_1 - y_2)+$.

Another way to generate an estimate for receiving nodes may include simplifying Equation (5). One simplification that does not significantly impact the accuracy of the estimated inventory quantities is to treat the salvage value as a constant ($\bar{r}$). A second simplification is treat lead times as deterministic for purposes of computing holding costs, though the relevant demand distributions may be mixtures. For example, let $\tilde{D}$ represent a random with the same distribution as $D(L_{1 \rightarrow})$, e.g., customer demand function which can be expressed as $F_{\tilde{D}}(\bullet) = \int P(D(t) \leq \bullet) dF_{L_{1 \rightarrow}}(t)$ where $F_{L_{1 \rightarrow}}(t)$ represents the customer demand function of time $L_{1 \rightarrow}$.

This distribution may be pre-computed once and stored in a memory location efficiently accessible by the estimation device. Given that the lead time and demand distributions may be sampled at equiprobable intervals, the cost of doing so is that of combining the quantiles of the different demand distributions into a sorted list. The list may be sorted by the quantiles such as from the lowest quantile to the highest quantile.

The quantity estimates may then be computed in a similar way discussed with reference to Equation (5). However, due to the simplifications, Equation (5) may be simplified to Equation (6).

$$\max_{y \geq 0} g(y \mid 1) = (p + \Lambda - c - t - s) E \min(y, \tilde{D}) - \quad \text{EQUATION 6}$$
$$(c + t + hl_{1 \rightarrow} - \bar{r}) E(y - \tilde{D})^+.$$

As above, the inventory estimate may be generated based on whether the receiving node has an alternate source. Equation (6) can be expressed as a newsvendor problem similar to Equation (2). Accordingly, the estimated inventory quantity may be generated using a similar form of Equation (3).

The estimates for the fulfillment centers along a given path that are generated at block 514 are added to any existing estimate for a corresponding FC at block 516. This allows for the accumulation of quantity estimates for a FC from multiple paths (e.g., demand streams) through the network.

At block 518, a determination is made as to whether the network includes additional serial networks for demand streams which have not yet been estimated. If the determination is positive, the method 500 returns to block 512 to process a path for another demand stream as described. If the determination is negative, the method 500 proceeds to block 520.

At block 520, the network inventory planning server can provide the estimated inventory quantities such that it can be accessed by a planning device. Providing the estimated inventory quantities can include storing the quantities in an estimate data store such as the estimate data store 150. Providing the estimated inventory quantities may include transmitting a message to the planning device that requested the estimate. In some implementations, the estimated inventory quantities may be directly transmitted to the FCs for capacity planning. In some implementations, an inventory request may be transmitted to a source for the item such as a vendor or supplier. In this way, the current estimate can be communicated in real-time to keep all parties informed as to the capacity needs for the item and where those needs exist (e.g., which fulfillment centers).

The method 500 generates quantity estimates for an individual item through a serial network of preferred nodes. However, as discussed, some networks include alternate transmission paths and can handle more than one item.

Figure 6:
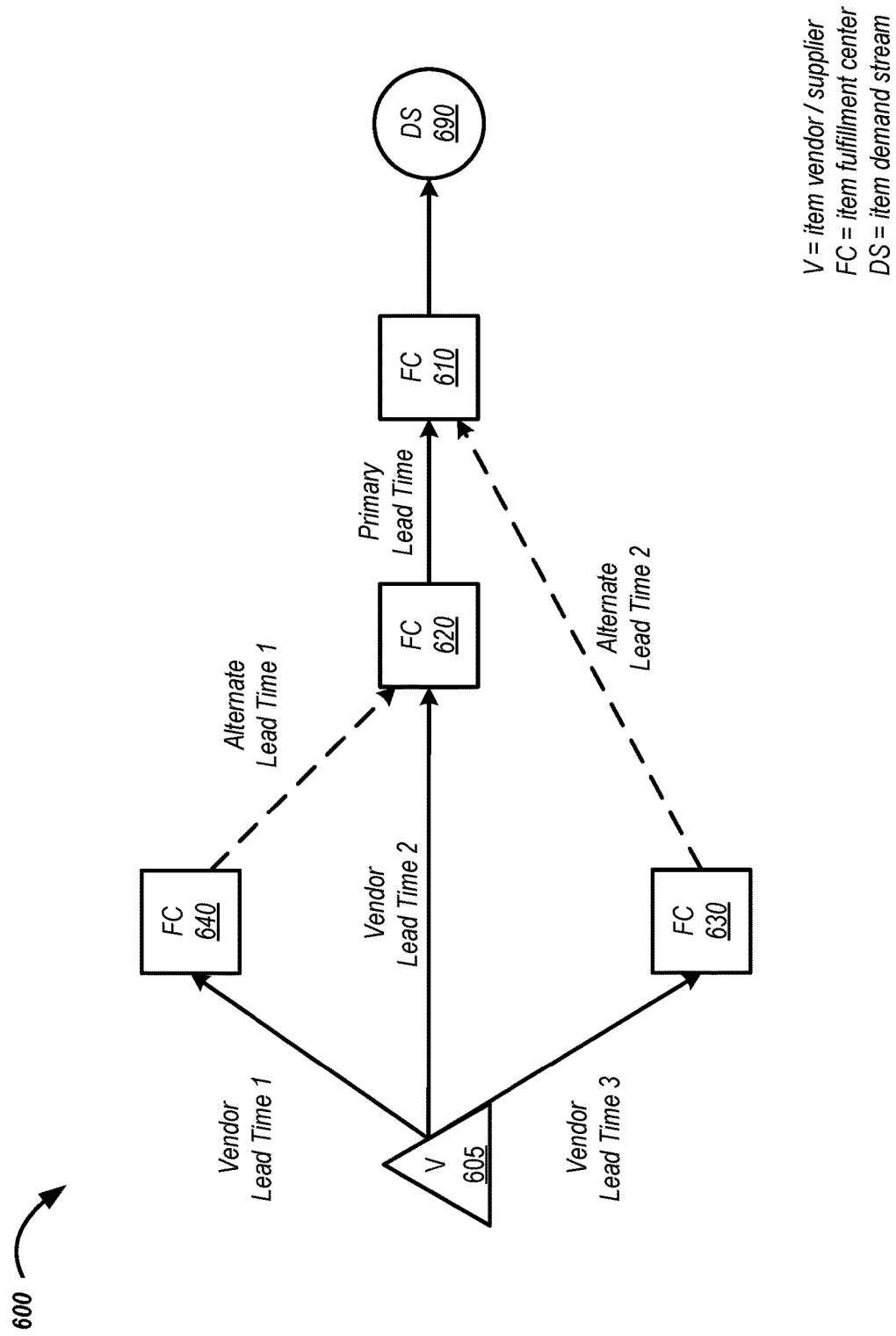
FIG. 6 is a tree diagram depicting an illustrative distribution network for an item demand stream that includes alternate item sources.

FIG. 6 is a tree diagram depicting an illustrative distribution network for an item demand stream that includes alternate item sources. The item demand stream 690 may be satisfied by destination FC 610 which receives the items from FC 620 which, in turn, receives the items from a vendor 605. The network 600 may include alternate paths to satisfy the item demand stream 690. For example, receiving FC 640 may supply FC 620. Similarly, FC 610 may receive some supply from receiving FC 630. Each path shown in the network 600 is associated with a lead time that can impact how long it may take for items to be transferred from a supplying node to a destination node. This time may be an important factor to ensure adequate supply at the right location at the right time especially given capacity constraints which may limit the ability of a particular FC to receive an item. The method 500 may provide an adequate estimate when considering a single path (e.g., vendor 605 to FC 620 to FC 610 to demand stream 690) and unconstrained fulfillment centers. But when alternate paths exist and FCs may be constrained by capacity, it may be desirable to adapt the method 500 to account for the additional items, paths, and constraints.

Figure 7A:
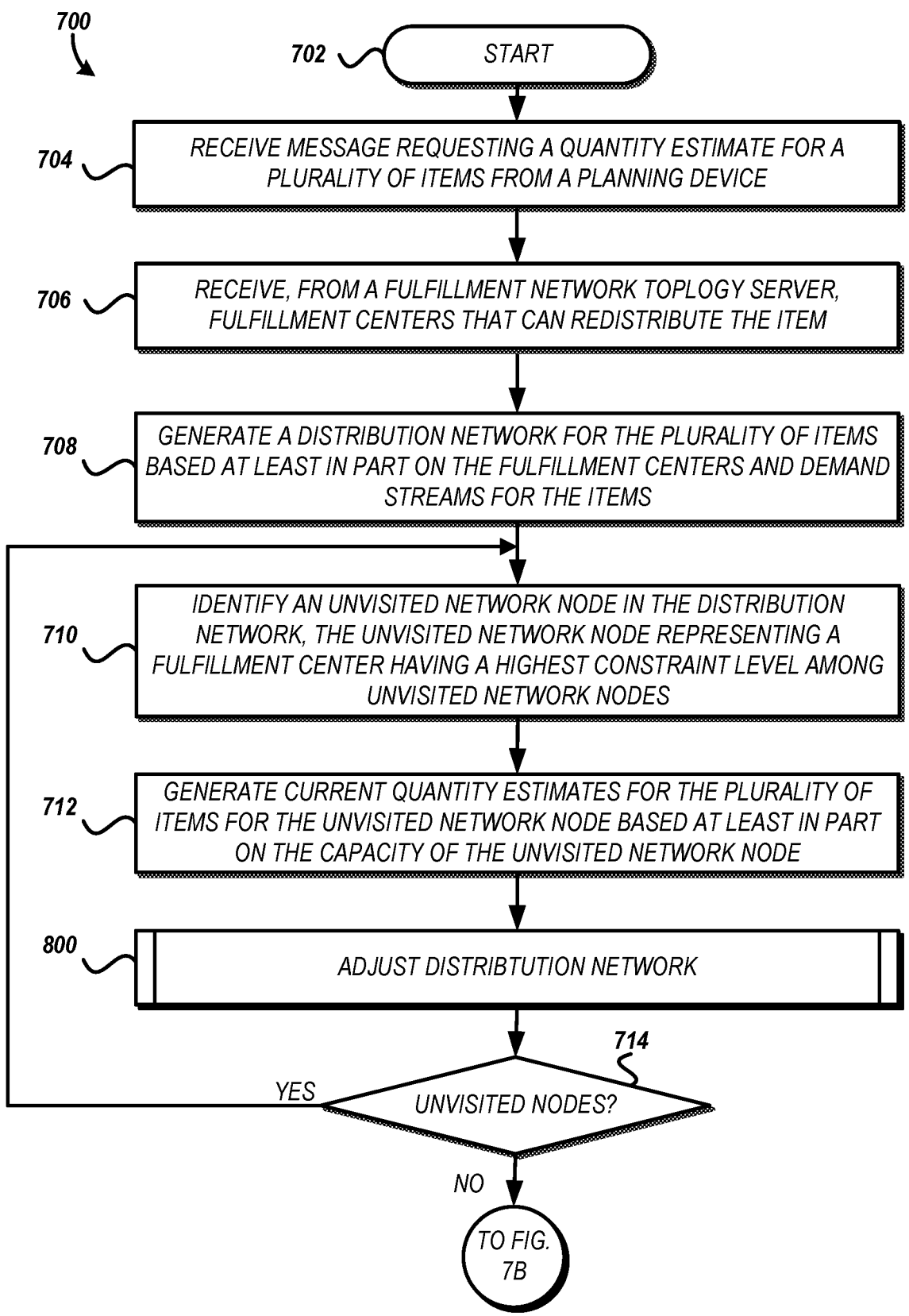
FIGS. 7A and 7B are flow diagrams depicting an illustrative method of estimating inventory quantities of multiple items for respective fulfillment centers under potential capacity constraints at fulfillment centers.
Figure 7B:
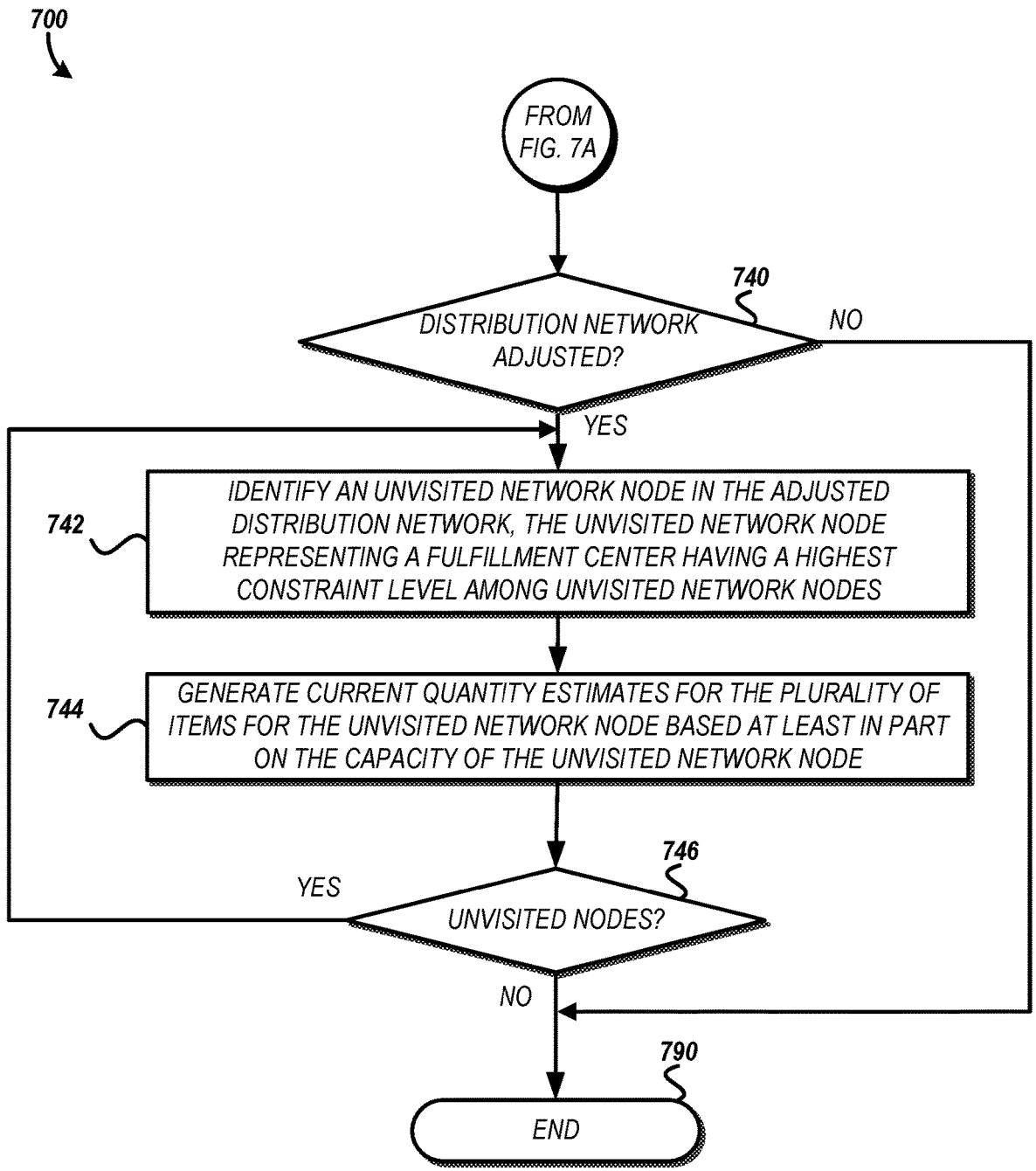

FIGS. 7A and 7B are flow diagrams depicting an illustrative method of estimating quantities of multiple items for respective fulfillment centers. The method 700 may be implemented in whole or in part by one or more of the devices described herein, such as the network inventory planning server 120 shown in FIG. 1, FIG. 2, or FIG. 4. The method 700 may be used to generate estimates for more than one item at a time for a heterogeneous distribution network. The method 700 includes consideration of network capacity constraints for each FC and a mix of items that may have varied properties such as different sources, transfer costs, sizes, and lag times.

As discussed, the problem of inventory management under FC-capacity constraints, for a multi-echelon (e.g., multi-tier) fulfillment network, in the presence of random regional demands and under a dynamic fulfillment policy is hard, and no solutions exist that provide accurate and timely estimates. The method 700 represents an approximate solution method that is efficient and scalable with an aim to capture the main aspects of the problem from a capacity management and profit optimization perspective. Some methods may include setting capacity-aware inventory targets assuming that each FC is being resupplied directly from the vendor. The method 700 includes this resupply assumption but also considers that the resupply may be from a source other than the vendor such as by leveraging the multi-echelon nature of the distribution network.

The method 700 for generating multi-item estimates uses implicitly, for each item and demand stream, a single-item target setting method, such as the method 500 shown in FIG. 5. In part for scalability reasons, the method 700 may consider the FCs one at a time, and generate target quantity estimates for each item and demand stream at a FC while meeting its storage capacity constraint. Then, with those targets fixed, the method 700 may generate target quantity estimates for the next FC in the distribution network. The method 700 makes two passes through the network such that each FC is visited twice. On the first pass, decisions can be made to change some paths (e.g., connections between network nodes) within the distribution network. On the second pass, the topology of the network may be fixed (e.g., no paths added or removed) and final inventory quantity estimates may be generated. On each pass, the order in which FCs are visited may be performed according to a predetermined sequence. For example: FCs that are necessarily leaf nodes for any item (e.g., general purpose FCs) are visited first, followed by all other FCs. The order may be determined based on a level of constraint for a fulfillment center. For example, a leaf node may represent a highly constrained node because of the limited sources (e.g., vendor or other fulfillment center) of the item and the demand stream it will service. The constraint level may also be based on a number of distribution paths to the node whereby a node with many distribution paths is less constrained than a node with fewer distribution paths. Constraint level may also be based on capacity of the fulfillment center. FCs may be ranked by the constraint levels such as from more to less capacity constrained, and visited in that order.

The method 700 may generate estimated inventory quantities indicating how much inventory to keep of each item at each FC in the network, and how to resupply FCs (potentially via transfers from within the network) to maximize overall network benefit (e.g., profit, cost savings, revenue, items processed, etc.) while satisfying FC-level capacity constraints. As stated earlier, it is intended that the solution will serve as part of a coordination mechanism between different inventory planning and control (IPC) systems. The coordination mechanism may have other systems consume approximate cost terms generate around optimized inventory targets. Partially for this reason, the method 700 may restrict attention to policies that can be described by a set of inventory targets (e.g., per item per FC) together with a preferred distribution network for each item (which is also a decision variable, and includes information on a default supplier for each FC, alternative supply paths, and fulfillment costs from each FC for each demand stream).

The method 700 begins at block 702 of FIG. 7A. At block 704, a network inventory planning server may receive a message requesting an estimate for a plurality of items. The message may be received from a planning device such as the planning device 110 shown in FIG. 1. The request may include information identifying items such as item identifiers.

At block 706, the network inventory planning server may receive information identifying fulfillment centers that can redistribute the items from a fulfillment network topology server. The redistribution may include receiving the item from a source (e.g., vendor) or another fulfillment center, storing the item, and providing the item to satisfy a demand stream or to another fulfillment center. The information may be presented as a list of fulfillment centers and include information about each fulfillment center such as capacity, location, etc.

The method 700 may then generate estimates for each item and demand stream at a given node, accumulating the estimates for the node as the method 700 continues. In this way, assigning inventory of an item to a node impacts the inventory levels of another item.

At block 708, the network inventory planning server or the fulfillment network topology server may generate a distribution network for the plurality of items based at least in part on the fulfillment centers identified at block 706 and demand streams for the plurality of items. The distribution network may be the configuration of nodes that minimizes total cost for satisfying the demand streams. The cost may be measured as transportation cost between nodes or time to transfer between nodes. In a computing network implementation, the cost may depend on the network used for transferring the items (e.g., public network, private network, metered network). In some implementations, the network generation at block 708 may include solving a shortest path problem to obtain a preferred distribution network for the items. The shortness of a path may be measured based on one or more of: cost, time, distance, number of nodes, or the like.

The shortest path may be a preferred serial network for the demand stream. The network generated at block 708 may include an alternative supplier for one or more nodes. Furthermore, if a demand stream can be satisfied via long zones, a sequence of demand spillover FCs may be identified. As will be described, the supply network may be changed for the demand stream by using the alternative supplier of an FC. These decisions may be made "locally" as a dynamic adjustment during estimation, rather than optimizing over a combinatorial number of network configurations.

At block 710, the network inventory planning server may identify an unvisited network node in the distribution network. An unvisited network node represents a fulfillment center which has not yet had quantity estimates assigned. The identification may be based on a constraint level for the node whereby the unvisited network node associated with the highest constraint level is visited.

At block 712, the network inventory planning server may generate a current quantity estimate for the item demand streams for the unvisited network node identified at block 710. The current quantity estimate for a demand stream j at FC i may be generated using an approximation of the network benefit from this demand stream, given the targets at FCs downstream from FC i (if any). To generate the estimate, a single-FC approximation of the benefit to the subnetwork from FC i downstream, with a newsvendor-type objective function, $g(y_{i,j}|i, j, w_j)$ may be generated where $w_j$ represents a subnetwork (e.g., alternate path) within the distribution network for the demand stream. The specific parameters of this newsvendor objective function may depend on the position of FC i within the subnetwork of demand stream j, and whether demand stream j can be satisfied via long zones. On expression of the newsvendor-type objective function is shown in Equation (7).

$$g(y_{i,j}|i,j,w_j) = (p_j + \Lambda_j - c^a - t_{\rightarrow i}{}^a - s_{i,j})E\min(y_{i,j}, D_j(\tau_{i,j})) - (h_i^a \tau_{i,j} + c^a + t_{\rightarrow i}{}^a - \bar{r}_i^a)E(y - D_j(\tau_{i,j}))^+ + \delta(p_j + \Lambda_j - c^a - t_{\rightarrow k}{}^a - s_{k,j})E(D_j(\tau_{i,j}) - y_{i,j})^+$$

EQUATION 7

In Equation (7), δ=1 if a demand stream j can be satisfied via long zones and δ=0 otherwise. FC k denotes the FC to which demand would be planned to spill over (e.g., transfer inventory from one or more upstream fulfillment centers). FC k corresponds to the FC with the smallest fulfillment cost for demand stream j that has not yet been assigned an estimate. In Equation (7), $\tau_{i,j}(w_j)$ represents the relevant planning horizon for the newsvendor approximation at FC i for demand stream j, and corresponds to the review period for the item at FC i, plus the lead time to FC i from its immediate supplier in the subnetwork $(w_j)$ plus the sum of the transfer lead times downstream from FC i in the subnetwork $(w_j)$. The salvage value $(r_i^{-a})$ may be taken as a constant salvage value $r^{-a}$) if FC i is supplied from the vendor or an inbound cross-dock destination node in the subnetwork $(w_j)$, and equal to $c^a + t_{\rightarrow i}{}^a$ otherwise.

When generating an inventory quantity estimate for demand streams at a given FC i, one goal may be to maximize the benefits for each item demand stream across the FCs while respecting the aggregated constraints (e.g., resources at each FC such as capacity) for each FC. Capacity utilization may be based on the quantity assigned to the FC less quantities that will be transferred to downstream FCs, less the expected demand between now and the lag time for receiving items from an upstream FC or vendor, plus any inventory maintained in excess of the estimated inventory quantity to satisfy demand during the lag time for receiving items from an upstream FC. Equation (8) is one expression of capacity utilization (u) where $RP_i^a$ represents the review period at FC i and (i, j) is the FC directly downstream from FC i in the subnetwork $(w_j)$.

$$u(i,j|y_j, w_j) = y_{i,j} - y_{C(i,j),j} - E\, D_j(0, \tau_{i,j} - RP_i^a)^+ + E(y_{i,j} - D(\tau_{i,j}))^+$$

EQUATION (8)

Having generated an estimate at block 712, at block 800, the distribution network may be adjusted to account for alternate distribution nodes for one or more of the plurality of items.

Figure 8:
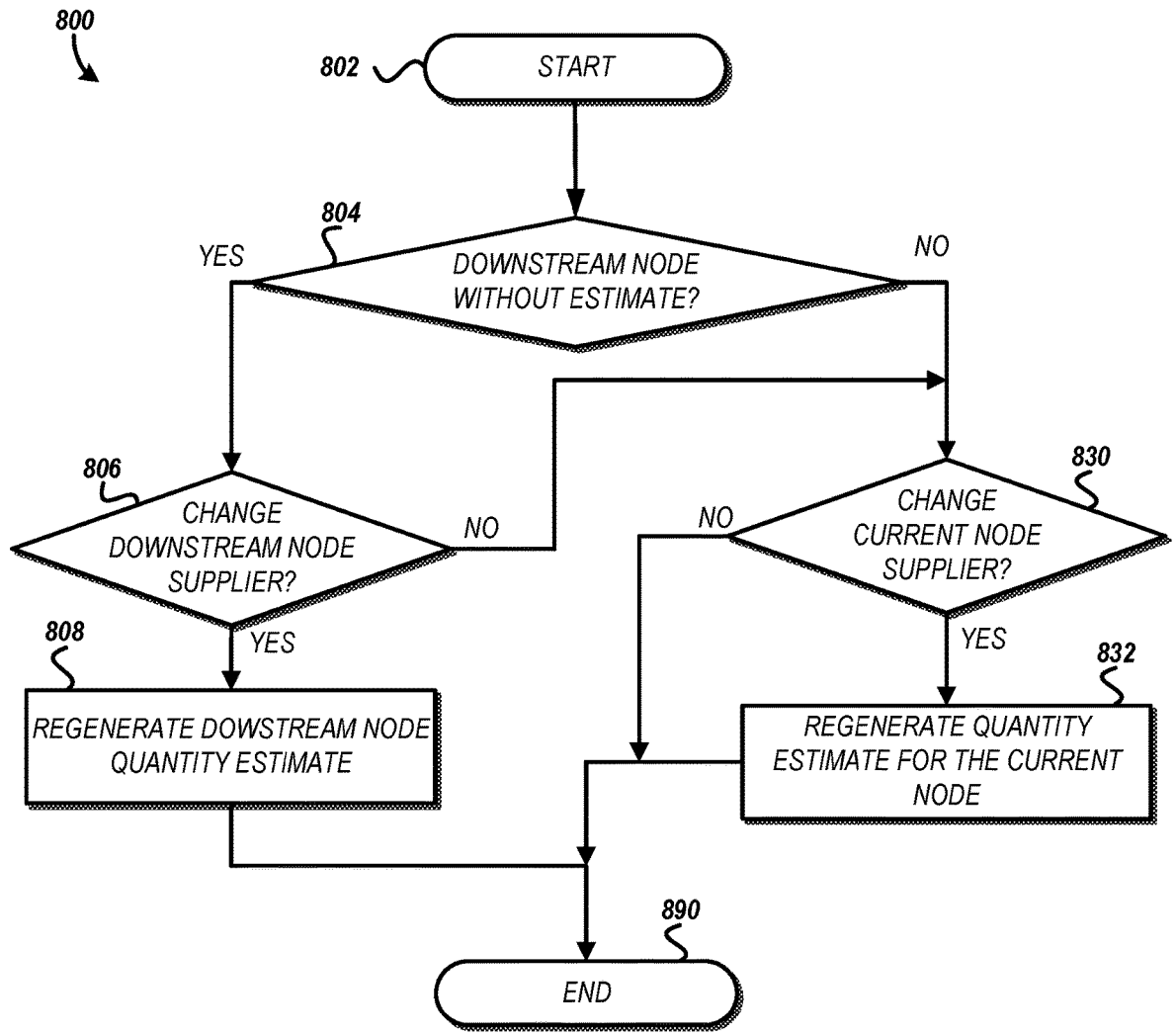
FIG. 8 is a flow diagram depicting an illustrative method of dynamically adjusting a fulfillment distribution network.

FIG. 8 is a flow diagram depicting an illustrative method of dynamically adjusting a fulfillment distribution network. The method 800 may be used to identify changes to a preferred network that leverage alternate paths for an item through the distribution network to achieve similar or more efficient inventory placement across fulfillment centers.

The method 800 begins at block 802 assuming a current node is identified within a distribution network. At block 804, a determination may be made as to whether a node downstream from the current node exists without an estimate within the distribution network. If so, the method 800 may move to block 806 to determine whether to change the node distributing items to a downstream node (e.g., a node which is downstream from the current node being processed). For example, in the network 600 shown in FIG. 6, when computing target for demand stream 690 at FC 620, the determination at block 806 determines whether to switch FC 610 to be supplied from the alternate FC 630. The determination at block 806 may be based on a comparison of the benefit of supplying the FC using the primary network versus the benefit of supplying the FC from an alternate source. Equation (8) provides one expression of this comparison.

$$g(y_{i,j}|i,j,w_j)/\tau_{i,j}(w_j) < g(y_{k,j}|k,j,\tilde{w}_j)/\tau(k,j\tilde{w}_j)$$

EQUATION 8

If the determination at block 806 is positive, the alternate supplier may be identified within the network as the preferred supplier. The method 800 may proceed to block 808 where downstream node quantity estimates may be regenerated by the network inventory planning server. Regenerating estimates may include generating estimates for the plurality of items and demand streams where the downstream node receives stock from the current node.

If the determination at block 806 is negative, the method 800 may proceed to block 830. Block 830 may also be reached if the determination at block 804 is negative. At block 830, a determination may be made as to whether to change the distribution node providing items to the current node. A similar benefit comparison as used at block 806 may be performed to identify whether the benefit of an alternate network exceeds the benefit of the primary network. If the determination at block 830 is affirmative, the distribution network may be adjusted to change the primary distribution path to the current node from a current source to an alternate source. The method 800 may then, at block 832 regenerate an estimate for the current node based on the new distribution source (see, e.g., Equation (7)).

When generating or regenerating the downstream estimates, it may be desirable to include a cap on the capacity for the downstream FCs. For example, expected fill rate in single FC approximation for k may be assigned to match a fill rate in single FC approximation for i under $y_{i,j}$. For example, if a fulfillment center has only one upstream fulfillment center that can provide inventory, if the upstream fulfillment center has an inventory capacity of x for an item, the fulfillment center should have a capacity that is no greater than x.

Returning to block 830, if the primary network benefit exceeds the alternate network benefit, no change to the distribution network is needed and the method 800 may end at block 890. The method 800 may also terminate after regenerating estimates at block 808 or 832.

Returning to FIG. 7A, after performing the distribution network adjustment (if any) at block 800, the method 700 may proceed to block 714 to determine whether additional unvisited nodes exist within the distribution network. If nodes remain without estimates, the method 700 may return to block 710 as described to generate estimates for other item demand streams. If the determination at block 714 is negative, the method 700 may continue on FIG. 7B at block 716.

Because a first phase of method 700 shown in FIG. 7A may alter the initial distribution network, it may be desirable to generate estimates for each FC based on an adjusted network from the first pass. During the second phase shown in FIG. 7B, the distribution network may be held constant while generating estimates for each FC node using any network adjustments identified during the first pass.

Because the second phase may be needed only in the event an adjustment was applied to the distribution network, at block 740, the network inventory planning server may determine whether the distribution network has been adjusted. The determination may be based on a value that is set in association with the distribution network indicating an adjustment. The value may be a binary value that is set to a specified value upon application of any adjustment to the distribution network.

If the determination at block 740 is negative, the method 700 may end at block 790. Since no adjustments may have been applied to the distribution network, the estimates generated during the first phase need not be revisited. However, if the determination at block 740 is affirmative, the estimates generated during the first phase may need revisiting based on different distribution paths in the adjusted distribution network.

If the determination at block 740 is affirmative, at block 742, the network inventory planning server may identify an unvisited network node in the adjusted distribution network. An unvisited network node represents a fulfillment center which has not yet had quantity estimates assigned. The identification may be based on a constraint level for the node whereby the unvisited network node associated with the highest constraint level is visited.

Similar to block 712 of FIG. 7A, at block 744A, the network inventory planning server may generate quantity estimates for the plurality of items for the unvisited network node based at least in part on the capacity of the unvisited network node. A determination at block 746 confirms whether all nodes in the adjusted distribution network have been visited. If the determination at block 746 is negative, the method 700 may return to block 742 to continue generating estimates for unvisited nodes. If the determination at block 746 is affirmative, the method 700 may end at block 790.

Experimental results show that the multi-echelon features described provide significant benefits over "flat" network planning which ignores any upstream or downstream nodes. Table 2 provides a comparison of single item plans for a series of FCs under the multi-echelon estimation described here and a flat plan. The FCs include receiving inbound cross-dock FCs (IDX1, IDX2, and IDX3), intermediate nodes (INTER-1 through INTER-5), and destination nodes (DEST-1 through DEST-5) that can be supplied by at least one of the intermediate nodes.

TABLE 2

| FC | Echelon Targets | |
|---|---|---|
| | Multi-Echelon Plan | "Flat" Plan |
| Network Total | 257 | 233 |
| IDX1 | 31 | 27 |
| IDX2 | 43 | 41 |
| IDX3 | 152 | 133 |
| INTER-1 | 37 | 33 |
| INTER-2 | 31 | 27 |
| INTER-3 | 43 | 41 |
| INTER-4 | 115 | 100 |
| INTER-5 | 31 | 31 |
| DEST-1 | 6 | 0 |
| DEST-2 | 6 | 0 |
| DEST-3 | 3 | 0 |
| DEST-4 | 10 | 0 |
| DEST-5 | 13 | 0 |

The multi-echelon plan distributes more items throughout the network to ensure sufficient supply is on hand for the expected demand. The multi-echelon plan also increases the overall benefit due to the availability of inventory to satisfy the expected demand in a timely fashion. The multi-echelon plan also affords more control over the overall distribution network performance by allowing upstream fulfillment centers to hold more inventory for redistribution to downstream fulfillment centers when needed. This allows the upstream fulfillment centers to dynamically adjust where the inventory is redistributed to achieve the highest benefit. This avoids asymmetries between supply within the fulfillment network and how heterogeneous demand streams may be satisfied.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a network inventory planning server, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A network inventory planning server can be or include a microprocessor, but in the alternative, the network inventory planning server can be or include a controller, microcontroller, or state machine, combinations of the same, or the like configured to estimate and communicate network inventory planning information. A network inventory planning server can include electrical circuitry configured to process computer-executable instructions. Although described herein primarily with respect to digital technology, a network inventory planning server may also include primarily analog components. For example, some or all of the network inventory planning algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a network inventory planning server, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the network inventory planning server such that the network inventory planning server can read information from, and write information to, the storage medium. In the alternative, the storage medium can be integral to the network inventory planning server. The network inventory planning server and the storage medium can reside in an ASIC. The ASIC can reside in a user terminal. In the alternative, the network inventory planning server and the storage medium can reside as discrete components in a user terminal (e.g., planning device).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™, .NET™, web services, and rich site summary (RSS). In some implementations, a UI may be included in a stand-alone client (for example, thick client, fat client) configured to communicate (e.g., send or receive data) in accordance with one or more of the aspects described.

Some of the expressions and equations may include notations which are summarized in Table 2.

| | |
|---|---|
| $\mathcal{F}$ | Set of fulfillment centers |
| $\mathcal{A}$ | Set of items |
| $\mathcal{R}^a$ | Set of demand streams for item a |
| $K_i$ | Storage capacity for FC i |
| $I^a \subset \mathcal{F}$ | Inbound nodes for item a |
| $\check{I}^a = I \cup \{i : \mathcal{P}(i) \in \mathcal{X}\}$ | Nodes supplied from a vendor or IXD |
| $s_{ij}^a$ | Shipping cost per unit of item a to serve region j demand stream from FC i |
| $t_{ik}^a$ | Cost per unit of item a to transfer from FC i to FC k |
| $\tilde{l}_{ik}$ | Transfer lead time between FC i and FC k |
| $p_j^a$ | Price of item a for region j demand stream |
| $c^a$ | Procurement cost for item a |
| $v^a$ | Per unit volume for item a |
| $\Lambda_j^a$ | In-stock value of item a for region j demand stream |
| $D_j^a(t)$ | Demand for item a in region j during time interval (0, t] |
| $\hat{y}_{ij}^a$ | Estimated quantity for item a allocated to demand stream j at FC i |
| $\hat{y}_i^a$ | Estimated quantity for item a at FC I for all demand streams |

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A network inventory planning system comprising:
   a computer-readable memory storing executable instructions; and
   one or more computer processors in communication with the computer-readable memory, wherein the one or more computer processors are configured to execute the executable instructions to at least:
      receive, from a planning device a request for a quantity estimate of an item to be allocated to a plurality of nodes in a network, wherein each node of the plurality of nodes is configured to redistribute the item from a source to a plurality of destinations,
      identify a first destination of the plurality of destinations for the item, the first destination associated with a first demand, wherein a first node of the plurality of nodes redistributes the item to the first destination,
      identify a second destination of the plurality of destinations for the item, the second destination associated with a second demand, wherein a second node of the plurality of nodes redistributes the item to the second destination and the first node,
      determine a first storage capacity constraint and a first inventory parameter of the first node and a second storage capacity constraint and a second inventory parameter of the second node,
      identify, from a topology server, a distribution network that can distribute the item to the first destination and the second destination, wherein the distribution network comprises the first node and the second node,
      generate a first path, in the distribution network, from the source to the first destination to satisfy the first demand, wherein the first path includes the first node and the second node, and wherein to generate the first path, the one or more computer processors are configured to execute the executable instructions to at least:
         (i) generate a first quantity of the item for the first node that satisfies the first storage capacity constraint and considers the first inventory parameter and the first demand, and
         (ii) generate a second quantity of the item for the second node that satisfies the second storage capacity constraint and considers the first quantity, the second inventory parameter, and the first demand,
      generate a second path, in the distribution network, from the source to the second destination to satisfy the second demand, wherein the second path includes the second node, and wherein to generate the second path, the one or more computer processors are configured to execute the executable instructions to at least:
         generate a third quantity of the item for the second node that satisfies the second storage capacity constraint and considers the second quantity, the second inventory parameter, and the second demand,
      generate a first quantity estimate of the item for the first node based at least in part on the first quantity,
      generate a second quantity estimate of the item for the second node based at least in part on an aggregation of the second quantity and the third quantity, and transmit a message including the first quantity estimate and the second quantity estimate to the planning device.

2. The network inventory planning system of claim 1, wherein the one or more computer processors are configured to execute further executable instructions to at least:
store the first quantity estimate and the second quantity estimate in a data store;
determine a change in an operational characteristic of at least one of the first node or the second node;
generate a revised first quantity estimate for the first node and a revised second quantity estimate for the second node based at least in part on the operational characteristic;
determine that at least one of:
the revised first quantity estimate deviates from the first quantity estimate by a threshold amount, or
the revised second quantity estimate deviates from the second quantity estimate by a second threshold amount, and
transmit an update message including at least one of the revised first quantity estimate or the revised second quantity estimate to the planning device.

3. The network inventory planning system of claim 2, wherein the one or more computer processors are configured to execute further executable instructions to at least:
store time information indicating when the first quantity estimate and the second quantity estimate were generated; and
compare a current time with the time information to determine a threshold quantity of time has elapsed; and
wherein the update message is transmitted in response to determining the threshold quantity of time has elapsed.

4. The network inventory planning system of claim 1, wherein:
the distribution network is identified based at least in part on a cost to redistribute the item from the second node to the first node.

5. The network inventory planning system of claim 1, wherein the one or more computer processors are configured to execute further executable instructions to at least:
generate a target metric based at least in part on the distribution network including the first path and the second path;
identify an alternate path from the source to one of the first destination or the second destination to satisfy a corresponding demand;
generate an alternate target metric based at least in part on an alternate distribution network including the alternate path;
determine that the alternate target metric exceeds the target metric; and
identify the alternate path as a preferred path for the distribution network.

6. The network inventory planning system of claim 1, wherein the one or more computer processors are configured to execute further executable instructions to at least:
generate a plurality of paths for the item, the plurality of paths including the first path and the second path;
generate the first quantity estimate based at least in part on an aggregation of the quantity estimates of the item for the nodes in each path of the plurality of paths that includes the first node; and
generate the second quantity estimate of the item based at least in part on an aggregation of quantity estimates of the item for the nodes in each path of the plurality of paths that includes the second node.

7. The network inventory planning system of claim 1, wherein the one or more computer processors are configured to execute further executable instructions to at least:
generate the first quantity for an item at a specific node estimate based at least in part on:
(i) a received benefit for the first destination for a period of time based at least in part on a unit benefit for the item,
(ii) a holding cost for maintaining the first quantity estimate for the period of time,
(iii) a downstream benefit for the first demand, and
(iv) the first quantity; and
generate the second quantity estimate based at least in part on:
(i) a received benefit for the first destination and a received benefit for the second destination for a period of time based at least in part on a unit benefit for the item,
(ii) a holding cost for maintaining the second quantity estimate for the period of time,
(iii) a downstream benefit for the first demand and a downstream benefit for the second demand, and
(iv) the aggregation of the second quantity and the third quantity.

8. The network inventory planning system of claim 1, wherein the request for the quantity estimate of the item includes a unit volume for the item, and
wherein the one or more computer processors are configured to execute further executable instructions to at least:
generate the first quantity estimate based at least in part on the first quantity and the unit volume for the item; and
generate the second quantity estimate based at least in part on the unit volume for the item and the aggregation of the second quantity and the third quantity.

9. The network inventory planning system of claim 8, wherein the one or more computer processors are configured to execute further executable instructions to at least:
receive a second unit volume for a second item;
generate the first quantity estimate based at least in part on the first quantity and the second unit volume for the second item; and
generate the second quantity estimate based at least in part on the second unit volume for the second item and the aggregation of the second quantity and the third quantity.

10. A computer-implemented method comprising:
under control of one or more computing devices executing specific computer-executable instructions,
receiving, from a planning device a request for a quantity estimate of an item to be allocated to a plurality of nodes in a network, wherein each node of the plurality of nodes is configured to redistribute the item from a source to a plurality of destinations;
identifying a first destination of the plurality of destinations for the item, the first destination associated with a first demand, wherein a first node of the plurality of nodes redistributes the item to the first destination;

identifying a second destination of the plurality of destinations for the item, the second destination associated with a second demand, wherein a second node of the plurality of nodes redistributes the item to the second destination and the first node;

determining a first storage capacity constraint and a first inventory parameter of the first node and a second storage capacity constraint and a second inventory parameter of the second node;

identifying, from a topology server, a distribution network that can distribute the item to the first destination and the second destination, wherein the distribution network comprises the first node and the second node;

generating a first path, in the distribution network, from the source to the first destination to satisfy the first demand, wherein the first path includes the first node and the second node, and wherein generating the first path comprises:
  (i) generating a first quantity of the item for the first node that satisfies the first storage capacity constraint and considers the first inventory parameter and the first demand, and
  (ii) generating a second quantity of the item for the second node that satisfies the second storage capacity constraint and considers the first quantity, the second inventory parameter, and the first demand;

generating a second path, in the distribution network, from the source to the second destination to satisfy the second demand, wherein the second path includes the second node, and wherein generating the second path comprises:
  generating a third quantity of the item for the second node that satisfies the second storage capacity constraint and considers the second quantity, the second inventory parameter, and the second demand;

generating a first quantity estimate of the item for the first node based at least in part on the first quantity;

generating a second quantity estimate of the item for the second node based at least in part on an aggregation of the second quantity and the third quantity; and transmitting a message including the first quantity estimate and the second quantity estimate to the planning device.

11. The computer-implemented method of claim 10, further comprising:
storing the first quantity estimate and the second quantity estimate in a data store;
detecting a change in an operational characteristic of at least one of the first node or the second node;
generating a revised first quantity estimate for the first node and a revised second quantity estimate for the second node based at least in part on the operational characteristic;
determining that at least one of:
  the revised first quantity estimate deviates from the first quantity estimate by a threshold amount, or
  the revised second quantity estimate deviates from the second quantity estimate by a second threshold amount; and
transmitting an update message including at least one of the revised first quantity estimate or the revised second quantity estimate to the planning device.

12. The computer-implemented method of claim 11, further comprising:
storing time information indicating when the first quantity estimate and the second quantity estimate were generated; and
comparing a current time with the time information to determine a threshold quantity of time has elapsed;
wherein the updated message is transmitted in response to determining the threshold quantity of time has elapsed.

13. The computer-implemented method of claim 10, wherein the distribution network is identified based at least in part on a cost to redistribute the item from the second node to the first node.

14. The computer-implemented method of claim 13, further comprising:
generating a target metric based at least in part on the distribution network including the first path and the second path;
identifying an alternate path from the source to one of the first destination or the second destination to satisfy a corresponding demand;
generating an alternate target metric based at least in part on an alternate distribution network including the alternate path;
determining that the alternate target metric exceeds the target metric; and
identifying the alternate path as a preferred path for the distribution network.

15. The computer-implemented method of claim 10, further comprising:
generating a plurality of paths for the item, the plurality of paths including the first path and the second path;
generating the first quantity estimate of the item based at least in part on an aggregation of the quantity estimates of the item for the nodes in each path of the plurality of paths that includes the first node; and
generating the second quantity estimate of the item based at least in part on an aggregation of quantity estimates of the item for the nodes in each path of the plurality of paths that includes the second node.

16. The computer-implemented method of claim 10, further comprising:
generating the first quantity estimate based at least in part on:
  (i) a received benefit for the first destination for a period of time based at least in part on a unit benefit for the item,
  (ii) a holding cost for maintaining the first quantity estimate for the period of time,
  (iii) a downstream benefit for the first demand, and
  (iv) the first quantity; and
generating the second quantity estimate based at least in part on:
  (i) a received benefit for the first destination and a received benefit for the second destination for a period of time based at least in part on a unit benefit for the item,
  (ii) a holding cost for maintaining the second quantity estimate for the period of time,
  (iii) a downstream benefit for the first demand and a downstream benefit for the second demand, and
  (iv) the aggregation of the second quantity and the third quantity.

17. The computer-implemented method of claim 16, the method further comprising:
generating at least one of the first quantity estimate and the second quantity estimate based at least in part on a computing resource including at least one of: power, bandwidth, or memory available to an electronic device.

18. A planning system comprising:
a computer-readable memory storing executable instructions; and
one or more computer processors in communication with the computer-readable memory, wherein the one or more computer processors are configured to execute the executable instructions to at least:
receive, from a planning device, a request for a quantity estimate of an item to be allocated to a plurality of nodes in a network, wherein each node of the plurality of nodes is configured to redistribute the item from a source to a plurality of destinations,
identify a first destination of the plurality of destinations for the item, the first destination associated with a first demand, wherein a first node of the plurality of nodes redistributes the item to the first destination,
identify a second destination of the plurality of destinations for the item, the second destination associated with a second demand, wherein a second node of the plurality of nodes redistributes the item to the second destination and the first node,
determine a first storage capacity constraint and a first inventory parameter of the first node and a second storage capacity constraint and a second inventory parameter of the second node,
identify, from a topology server, a distribution network that can distribute the item to the first destination and the second destination, wherein the distribution network comprises the first node and the second node,
generate a first path, in the distribution network, from the source to the first destination to satisfy the first demand, wherein the first path includes the first node and the second node, and wherein to generate the first path, the one or more computer processors are configured to execute the executable instructions to at least:
(i) generate a first quantity of the item for the first node that satisfies the first storage capacity constraint and considers the first inventory parameter and the first demand, and
(ii) generate a second quantity of the item for the second node that satisfies the second storage capacity constraint and considers the first quantity, the second inventory parameter, and the first demand,
generate a second path, in the distribution network, from the source to the second destination to satisfy the second demand, wherein the second path includes the second node, and wherein to generate the second path, the one or more computer processors are configured to execute the executable instructions to at least:
generate a third quantity of the item for the second node that satisfies the second storage capacity constraint and considers the second quantity, the second inventory parameter, and the second demand,
generate a first quantity estimate of the item for the first node based at least in part on the first quantity,
generate a second quantity estimate of the item for the second node based at least in part on an aggregation of the second quantity and the third quantity, and
transmit a message including the first quantity estimate and the second quantity estimate to the planning device.

19. The network inventory planning system of claim 18, wherein the one or more computer processors are configured to execute further executable instructions to at least:
store the first quantity estimate and the second quantity in a data store;
determine a change for at least one of the first node or the second node;
generate a revised first quantity estimate for the first node and a revised second quantity estimate for the second node based at least in part on the change;
determine that at least one of:
the revised first quantity estimate deviates from the first quantity estimate by a threshold amount, or
the revised second quantity estimate deviates from the second quantity estimate by a second threshold amount; and
transmit an update message including at least one of the revised first quantity estimate or the revised second quantity estimate to the planning device.

20. The network inventory planning system of claim 18, wherein the one or more computer processors are configured to execute further executable instructions to at least:
generate a plurality of paths for the item, the plurality of paths including the first path and the second path;
generate the first quantity estimate based at least in part on an aggregation of the quantities estimates of the item for the nodes in each path of the plurality of paths that includes the first node; and
generate the second quantity estimate of the item based at least in part on an aggregation of quantity estimates of the item for the nodes in each path of the plurality of paths that includes the second node.

* * * * *

UNITED STATES PATENT AND TRADEMARK OFFICE
CERTIFICATE OF CORRECTION

Page 1 of 2

PATENT NO. : 10,922,646 B1
APPLICATION NO. : 15/716299
DATED : February 16, 2021
INVENTOR(S) : Salal Humair It is certified that error appears in the above-identified patent and that said Letters Patent is hereby corrected as shown below:

On the Title Page

On Page 2, Column 1, Item (56), Line 13, under Other Publications, delete "Wilm" and insert --Wim--.

On Page 2, Column 1, Item (56), Line 20, under Other Publications, delete "Problems." and insert --Problems*.--.

On Page 2, Column 1, Item (56), Line 35, under Other Publications, delete "Replenishment." and insert --Replenishment*.--.

In the Drawings

On Sheet 1 of 9, FIG. 1, Line 10 (Approx.), delete "toplogy" and insert --topology--.

On Sheet 5 of 9, FIG. 5, Line 1, Reference Number 506, delete "TOPLOGY" and insert --TOPOLOGY--.

On Sheet 7 of 9, FIG. 7A, Line 1, Reference Number 706, delete "TOPLOGY" and insert --TOPOLOGY--.

On Sheet 7 of 9, FIG. 7A, Line 1, Reference Number 800, delete "DISTRIBTUTION" and insert --DISTRIBUTION--.

On Sheet 9 of 9, FIG. 8, Line 1, Reference Number 808, delete "DOWSTREAM" and insert --DOWNSTREAM--.

In the Specification

In Column 9, Line 23, delete "such at" and insert --such that--.

Signed and Sealed this
Sixth Day of July, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,922,646 B1

In Column 15, Line 39 (Approx.), delete "(0, t]" and insert --(0, t)--.

In Column 17, Line 23 (Approx.), delete "|n)" and insert --|1)--.

In Column 21, Line 26 (Approx.), delete "$c^a$-t→,1$^a$" and insert --$c^a$-$t^a$→i--.

In Column 21, Line 43, delete "$r^{-a}$)" and insert --($r^{-a}$)--.

In Column 22, Line 25 (Approx.), delete "(k,j$\tilde{w}_j$)" and insert --(k,j, $\tilde{w}_j$)--.

In Column 27, Line 51 (Approx.), delete "(0, t]" and insert --(0, t)--.

In the Claims

In Column 29, Line 22, Claim 2, delete "amount," and insert --amount;--.

In Column 29, Line 39, Claim 4, delete "wherein:" and insert --wherein--.

In Column 30, Line 11 (Approx.), Claim 7, after "quantity" delete "for an item at a specific node".

In Column 30, Line 61, Claim 10, delete "device" and insert --device,--.

In Column 34, Line 24, Claim 19, after "quantity" insert --estimate--.